US012809979B2

(12) United States Patent
Lee et al.

(10) Patent No.: US 12,809,979 B2
(45) Date of Patent: Nov. 24, 2026

(54) MEMORY DEVICE AND REFRESH METHOD THEREOF

(71) Applicant: Samsung Electronics Co., Ltd., Suwon-si (KR)

(72) Inventors: Myungkyu Lee, Suwon-si (KR); Eun Ae Lee, Suwon-si (KR); Sunghye Cho, Suwon-si (KR); Jung Min You, Suwon-si (KR); Kyomin Sohn, Suwon-si (KR); Kijun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 18/662,995

(22) Filed: May 13, 2024

(65) Prior Publication Data

US 2025/0156544 A1 May 15, 2025

(30) Foreign Application Priority Data

Nov. 9, 2023 (KR) ........................ 10-2023-0154767

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC ......................... G06F 21/566; G06F 2221/034
USPC ........................................................... 365/222
See application file for complete search history.

(56) References Cited

U.S. PATENT DOCUMENTS

| | | | | |
|---|---|---|---|---|
| 10,102,886 | B2 | 10/2018 | Crawford et al. | |
| 10,529,405 | B2 | 1/2020 | Lee et al. | |
| 10,818,337 | B2 | 10/2020 | Kuramori et al. | |
| 2021/0183433 | A1* | 6/2021 | Jenkinson | G11C 11/4087 |
| 2022/0068364 | A1* | 3/2022 | Ayyapureddi | G11C 11/4082 |
| 2022/0208251 | A1* | 6/2022 | Hong | G11C 11/406 |
| 2022/0415384 | A1* | 12/2022 | Seyedzadeh | G11C 11/40603 |
| 2023/0044186 | A1 | 2/2023 | You et al. | |
| 2023/0047007 | A1* | 2/2023 | Lovett | G11C 11/40615 |
| 2023/0118249 | A1 | 4/2023 | Go et al. | |
| 2023/0141789 | A1 | 5/2023 | Cho et al. | |

(Continued)

FOREIGN PATENT DOCUMENTS

KR 10-2385443 B1 4/2022

OTHER PUBLICATIONS

Kim, et. al., "Flipping bits in memory without accessing them: an experimental study of DRAM disturbance errors." In Proceeding of the 41st annual International Symposium on Computer Architecture (ISCA 2014).

*Primary Examiner* — Ly D Pham
(74) *Attorney, Agent, or Firm* — Muir Patent Law, PLLC

(57) ABSTRACT

A memory device may include an attack row selector configured to receive an activation signal at a first time point, and generate an update signal based on an accumulation value, an attack row register configured to receive an activation row address corresponding to the activation signal, and determine an attack row address based on the update signal and the activation row address, and a victim row determiner configured to determine a victim row address based on the attack row address. The accumulation value may be the number of activation signals received from a second time point before the first time point to the first time point.

10 Claims, 21 Drawing Sheets

(56) References Cited

U.S. PATENT DOCUMENTS

| | | | | |
|---|---|---|---|---|
| 2023/0154522 | A1* | 5/2023 | Kim | G11C 11/40603 365/222 |
| 2024/0069757 | A1* | 2/2024 | Ko | G11C 11/40607 |
| 2024/0144990 | A1* | 5/2024 | Kim | G11C 11/40622 |
| 2024/0185904 | A1* | 6/2024 | Kim | G11C 11/406 |
| 2024/0339145 | A1* | 10/2024 | Kim | G11C 11/40615 |
| 2024/0347100 | A1* | 10/2024 | He | G11C 11/4076 |

* cited by examiner

MEMORY DEVICE AND REFRESH METHOD THEREOF

CROSS-REFERENCE TO RELATED APPLICATION(S)

This application claims priority to and the benefit of Korean Patent Application No. 10-2023-0154767 filed in the Korean Intellectual Property Office on Nov. 9, 2023, the disclosure of which is incorporated herein by reference in its entirety.

BACKGROUND

(a) Field

The present disclosure relates to a memory device and a refresh method thereof.

(b) Description of the Related Art

Volatile memory devices, such as dynamic random-access memory (DRAM), store data by storing charges in the capacitor of a memory cell, and read data by determining the charge stored in the capacitor. Since the charge stored in the capacitor may leak over time, the memory device periodically performs a refresh operation.

The memory controller accesses the addresses of the memory device randomly, and may often focus access to particular addresses. As the density of memory cells in memory devices increases, the charge of memory cells in adjacent rows may be affected by the voltage distribution in a certain row. In particular, when a row is attacked by intensive access, data stored in memory cells of adjacent rows of the attacked row may be changed due to the voltage of the activated state of the attacked row. This phenomenon is called rowhammer. Therefore, the effective refresh on the adjacent rows may be needed for a rowhammer care.

SUMMARY

The present disclosure attempts to provide a memory device and a refresh method thereof capable of responding to attacks.

A memory device may include an attack row selector configured to receive an activation signal at a first time point, and generate an update signal based on an accumulation value, an attack row register configured to receive an activation row address corresponding to the activation signal, and determine an attack row address based on the update signal and the activation row address, and a victim row determiner configured to determine a victim row address based on the attack row address. The accumulation value may be the number of activation signals received from a second time point before the first time point to the first time point.

A memory device may include a memory cell array including a plurality of memory cells, and a refresh control circuit configured to receive a first activation signal and a first activation row address corresponding to the first activation signal from an external device at a first time point, and determine a victim row address to be refreshed on a victim row in the memory cell array based on an accumulation value. The accumulation value may be the number of activation signals received from a time point of receiving a refresh command from the external device to the first time point.

A refresh method of a memory device may include receiving a first activation signal and a first activation row address corresponding to the first activation signal at a first time point, generating a random number when the first activation signal is received, generating a reference value based on the number of activation signals received from an immediately previous first target row refresh (TRR) time point to the first time point, determining an attack row address based on a magnitude relationship between the random number and the reference value, determining a victim row address based on the attack row address, and performing a refresh operation on a victim row corresponding to the victim row address at a second TRR time point subsequent to the first time point.

DETAILED DESCRIPTION OF THE EMBODIMENTS

Figure 1:
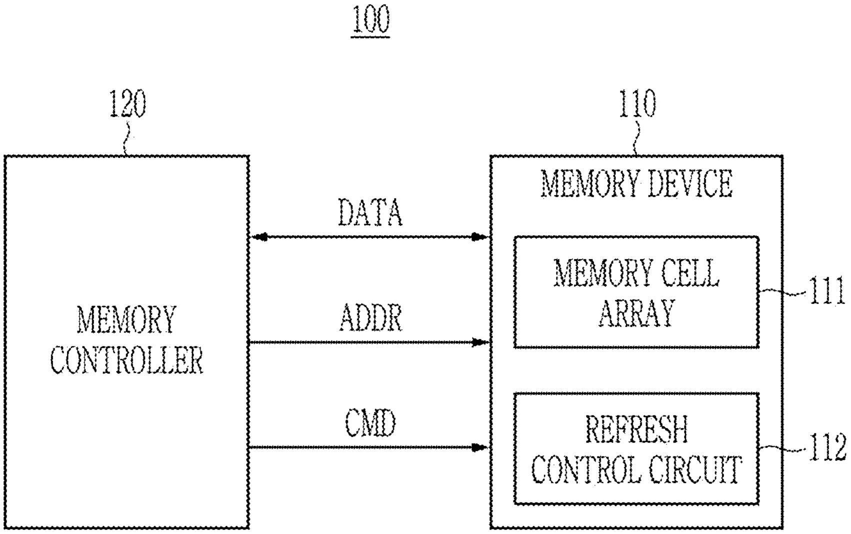
FIG. 1 is a block diagram of a memory system according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and specific operations may not be performed.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements.

FIG. 1 is a block diagram of a memory system according to an embodiment.

Referring to FIG. 1, a memory system 100 according to an embodiment may include a memory device 110 and a memory controller 120. In an embodiment, the memory device 110 and the memory controller 120 may be connected through a memory interface so as to exchange signals through the memory interface.

The memory device 110 may include a memory cell array 111 and a refresh control circuit 112. The memory cell array 111 may include a plurality of memory cells defined by a plurality of rows and a plurality of columns. In an embodiment, rows may be defined by wordlines, and columns may be defined as bitlines. The refresh control circuit 112 may detect an attack row (or aggressor row) among the plurality of rows, determine a row address (referred to as a "victim row address") of a victim row to be refreshed based on a row address (referred to as an "attack row address") of the attack row, and output the victim row address. In an embodiment, the attack row may be a rowhammer attack row, and the victim row may be a row that is a target of a rowhammer care. In an embodiment, the refresh control circuit 112 may select the attack row address, and may output the victim row address at a refresh time point.

The memory controller 120 may provide signals to the memory device 110 so as to control the memory operation of the memory device 110. The signals may include a command CMD and an address ADDR. In an embodiment, the memory controller 120 may further provide a clock signal to the memory device 110, and may control the operation of the memory device 110 by providing the command CMD and the address ADDR to the memory device 110 synchronously to the clock signal.

In an embodiment, the memory controller 120 may provide the command CMD and the address ADDR to the memory device 110, so as to control memory operations of the memory cell array 111 such as access, read, or write. According to a read operation, data may be transferred from the memory cell array 111 to the memory controller 120, and according to a write operation, data may be transferred from the memory controller 120 to the memory cell array 111.

The command CMD may include an activation command, a read/write command and a refresh command. In an embodiment, the command CMD may further include a precharge command. The activation command may be a command for converting a target row of the memory cell array 111 to an activated state in order to write data in the memory cell array 111 or read data from the memory cell array 111. The memory cell of the target row may be activated (e.g., driven) in response to the activation command. The read/write command may be a command for performing read or write operation in a target memory cell in the row converted to the activated state. The refresh command may be a command for performing the refresh operation in the memory cell array 111. In an embodiment, a control logic circuit (shown in FIG. 2) may output a normal refresh command (or normal refresh signal) or a target row refresh (TRR) command (or TRR signal) in response to the refresh command. The TRR command may correspond to the refresh command instructing the operation of refreshing the victim row. The normal refresh command may correspond to the refresh command for instructing a normal refresh operation, for example, an operation for sequentially refreshing rows of the memory cell array 111.

In an embodiment, the memory controller 120 may access the memory device 110 according to a request from an external host of the memory system 100. The memory controller 120 may communicate with the host by using various protocols.

The memory device 110 may be a storage device based on semiconductor devices. In an embodiment, the memory device 110 may include a dynamic random-access memory (DRAM) device. For example, the memory device 110 may be double data rate synchronous dynamic random-access memory (DDR SDRAM), low-power double data rate (LPDDR) SDRAM, graphics double data rate (GDDR) SDRAM, Rambus dynamic random-access memory (RDRAM), and the like.

In an embodiment, the memory device 110 may include other volatility or non-volatile memory devices in which refresh operation is used.

Figure 2:
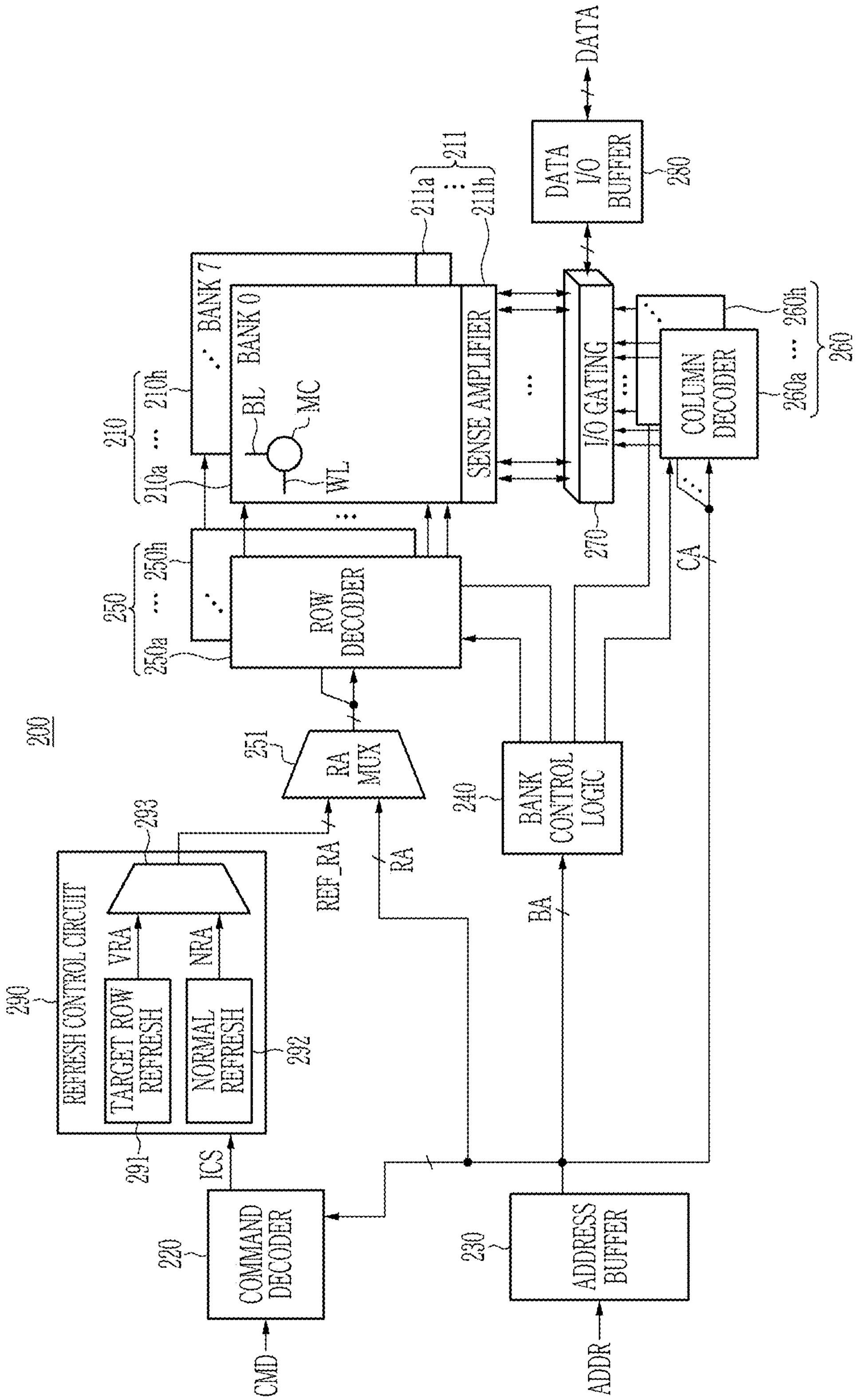
FIG. 2 is a block diagram of a memory device according to an embodiment.

FIG. 2 is a block diagram of a memory device according to an embodiment.

Referring to FIG. 2, a memory device 200 according to an embodiment may include a memory cell array 210, a sense amplifier 211, a control logic circuit 220, an address buffer 230, a row decoder 250, a column decoder 260, an input/output (I/O) gating circuit 270, a data I/O buffer 280 and a refresh control circuit 290.

The memory cell array 210 may include a plurality of memory cells MC. In an embodiment, the memory cell array 210 may include a plurality of memory banks 210*a* to 210*h*. Although FIG. 2 illustrates eight memory banks (BANK0 to BANK7) 210*a* to 210*h*, the number of memory banks is not limited thereto. Each of the memory banks 210*a* to 210*h* may include a plurality of rows, a plurality of columns, and a plurality of memory cells MC arranged at intersections of the plurality of rows and the plurality of columns. In an embodiment, the plurality of rows may be defined by a plurality of wordlines WL, and the plurality of columns may be defined by a plurality of bitlines BL.

The control logic circuit 220 may generate control signals ICS such that the memory device 200 may perform a read operation, a write operation, or a refresh operation. A command decoder included in the control logic circuit 220 may decode the command CMD received from a memory controller (e.g., 120 of FIG. 1) and the control logic circuit 220 may generate the control signals ICS. The control signals ICS may include an activation signal, a precharge signal, a refresh signal, a write signal, an erase signal, a read signal, and the like. The activation signal may correspond to the activation command from the memory controller 120. In an embodiment, the activation command from the memory controller 120 may be directly provided to the refresh control circuit 290. The refresh signal may include the normal refresh command, the TRR command, and the like. Depending on the embodiment, the control logic circuit 220 may output various signals to other components (e.g., the row decoder 250, and the like) of the memory device 200.

The address buffer 230 may receive the address ADDR provided from the memory controller 120. The address ADDR may include a row address RA indicating a row of the memory cell array 210 and a column address CA indicating a column. The row address RA is provided to the row decoder 250, and the column address CA is provided to the column decoder 260. The row address RA may be provided to the refresh control circuit 290 through the control logic circuit 220, or directly provided to the refresh control circuit 290. In an embodiment, the row address RA may be provided to the row decoder 250 through a row address multiplexer (RA MUX) 251. In an embodiment, the address ADDR may further include a bank address BA indicating a memory bank.

In an embodiment, the memory device 200 may further include the row address multiplexer 251. The row address multiplexer 251 may receive the row address RA from the address buffer 230, and receive a row address REF_RA to be refreshed from the refresh control circuit 290. The row address multiplexer 251 may selectively output the row address RA received from the address buffer 230 and the row address REF_RA received from the refresh control circuit 290 to the row decoder 250. In an embodiment, the row address multiplexer 251 may output the row address REF_RA to be refreshed in response to the internal command signal ICS (e.g., the refresh signal) from the control logic circuit 220.

Although FIG. 2 illustrates that the control logic circuit 220 and the address buffer 230 are separate components, but it is not necessarily limited thereto, and the control logic circuit 220 and the address buffer 230 may be implemented as in one component.

The row decoder 250 may select a row to be activated from among the plurality of rows of the memory cell array 210 based on a row address RA or REF_RA. For example, the row decoder 250 may apply a driving voltage to the wordline corresponding to the row to be activated. In an embodiment, a plurality of row decoders 250*a* to 250*h* corresponding respectively to the plurality of memory banks 210*a* to 210*h* may be provided.

The column decoder 260 may select a column to be activated from among the plurality of columns of the memory cell array 210 based on a column address. For example, the column decoder 260 may activate the sense amplifier 211 corresponding to the column address CA through the I/O gating circuit 270. In an embodiment, a plurality of column decoders 260*a* to 260*h* corresponding respectively to the plurality of memory banks 210*a* to 210*h* may be provided. In an embodiment, the I/O gating circuit 270 gates input/output data, and may include a data latch for storing data read from the memory cell array 210, and a write driver for writing data in the memory cell array 210. Data read from the memory cell array 210 may be detected by the sense amplifier 211, and may be stored in the I/O gating circuit 270 (e.g., the data latch). In an embodiment, plurality of sense amplifier (211*a* to 211*h*) corresponding respectively to the plurality of memory banks 210*a* to 210*h* may be provided.

In an embodiment, the memory device 200 may further include a bank control logic 240 that generates a bank control signal in response to the bank address BA. In response to the bank control signal, the row decoder 250 corresponding to the bank address BA among the plurality of row decoders 250*a* to 250*h* may be activated, and the column decoder 260 corresponding to the bank address BA among the plurality of column decoders 260*a* to 260*h* may be activated. The activated row decoder may apply a driving voltage to the wordline corresponding to the row to be activated.

In an embodiment, data read from the memory cell array 210 (e.g., data stored in the data latch) may be provided to the memory controller 120 through the data I/O buffer 280. Data to be written to the memory cell array 210 may be provided from the memory controller 120 to the data I/O buffer 280, and data provided in the data I/O buffer 280 may be provided to the I/O gating circuit 270.

The memory controller 120 may periodically transmit the command CMD related to the refresh operation to the memory device 110. The control logic circuit 220 may schedule the refresh based on the command CMD. Scheduling the refresh may be understood as determining the normal refresh and a ratio of TRR, and periodically generating the normal refresh command and the TRR command based on the determined ratio.

The refresh control circuit 290 may transfer the row address REF_RA to be refreshed to the row decoder 250 in response to the refresh signal among the internal command signal ICS. In an embodiment, the refresh control circuit 290 may include a TRR control circuit 291, a normal refresh control circuit 292 and a refresh row address selector 293. The TRR control circuit 291 and the normal refresh control circuit 292 may generate a row address VRA to which the TRR is to be performed and a row address NRA to which the normal refresh is to be performed based on a predetermined refresh ratio.

The TRR control circuit 291 may output the row address VRA in response to the TRR command among the internal command signal ICS. In an embodiment, the TRR command may be a rowhammer refresh command. The row address VRA may mean the victim row address. The TRR control circuit 291 may detect the attack row address in response to the activation signal among the internal command signal ICS. In an embodiment, the TRR control circuit 291 may determine one of an at least one activation row address corresponding to at least one the activation signal received between temporally adjacent two TRR commands (referred to as a "TRR interval") as the attack row address. The TRR control circuit 291 may calculate the row address VRA based on the attack row address.

The normal refresh control circuit 292 may output the row address NRA in response to the normal refresh command among the internal command signal ICS. The normal refresh control circuit 292 may calculate the row address NRA to which the normal refresh operation is to be performed, and output the row address NRA in response to the normal refresh command. The normal refresh control circuit 292 may sequentially increase or decrease the row address NRA whenever the normal refresh operation is performed.

The refresh row address selector 293 may selectively output the row address VRA from the TRR control circuit 291 or the row address NRA from the normal refresh control circuit 292. In an embodiment, the refresh row address selector 293 may output the row address NRA from the normal refresh control circuit 292 as the row address REF_RA in response to the normal refresh command, and may output the row address VRA from the TRR control circuit 291 as the refresh the row address REF_RA in response to the TRR command. In an embodiment, the control logic circuit 220 may randomly generate the TRR command or the normal refresh command in response to the refresh command. In an embodiment, the control logic circuit 220 may generate the TRR command and the normal refresh command based on the predetermined refresh ratio, in response to the refresh command.

For example, the memory device 200 may perform TRR based on the TRR command and the row address VRA, and perform the normal refresh based on the normal refresh command and the row address NRA. As such, the memory device 200 may always perform the refresh at the refresh time point, and by selecting one of the activation row addresses with a substantially equivalent probability, may provide robust defense performance with respect to various attack patterns.

Figure 3:
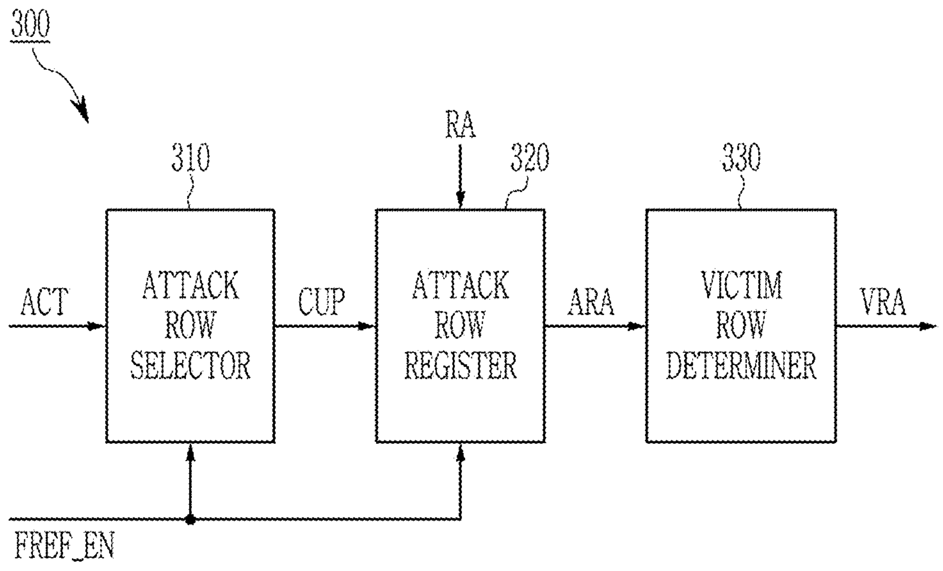
FIG. 3 is a block diagram of a TRR control circuit according to an embodiment.

FIG. 3 is a block diagram of a TRR control circuit according to an embodiment.

Referring to FIG. 3, a TRR control circuit 300 according to an embodiment may determine a victim row address VRA based on an activation signal ACT, a TRR command FREF_EN, and a row address RA. In an embodiment, the TRR control circuit 300 may include an attack row selector (or attack row determiner) 310, an attack row register 320, and a victim row determiner 330. The attack row selector 310 and the attack row register 320 may determine the attack row address, and the victim row determiner 330 may determine the victim row address VRA.

The attack row selector 310 may receive the activation signal ACT and the TRR command FREF_EN. The attack row selector 310 may generate an update signal CUP based on the activation signal ACT. For example, the attack row selector 310 may generate a first value that is a random number when the activation signal ACT is received. In addition, upon receiving the activation signal ACT, the attack row selector 310 may generate a second value based on the number of received activation signals ACT. The attack row selector 310 may calculate the number of received activation signals ACT from a time point of receiving the TRR command FREF_EN to a current time point. In an embodiment, the attack row selector 310 may calculate the number of received activation signals ACT until the current time point after performing the TRR in response to the TRR command FREF_EN. The number of activation signals ACT may be understood as an accumulation value. In an embodiment, the attack row selector 310 may include a counter for counting the activation signal ACT. The counter may be initialized based on the TRR command FREF_EN. For example, the counter may set to '0' in response to the TRR command FREF_EN of the first level. In an embodiment, the first level of the TRR command FREF_EN may be a high level, but embodiment is not limited thereto.

The attack row selector 310 may compare the first value with the second value, and generate the update signal CUP based on the comparison result. For example, when the first value is smaller than (or smaller than or equal to) the second value, the attack row selector 310 may generate the update signal CUP of a first level. When the first value is greater than or equal to (or greater than) the second value, the attack row selector 310 may generate the update signal CUP of a second level. In an embodiment, the first level of the update signal CUP may be a high level and the second level of the update signal CUP may be a low level, but embodiment is not limited thereto.

The attack row selector 310 may transfer the update signal CUP to the attack row register 320. The attack row selector 310 may perform initialization based on the TRR command FREF_EN.

The attack row register 320 may receive the TRR command FREF_EN, the row address RA, and the update signal CUP. The row address RA may be an address corresponding to the activation signal ACT. The attack row register 320 may store the row address RA based on the update signal CUP. For example, upon receiving the update signal CUP of the first level, the attack row register 320 may store the row address RA. Upon receiving the update signal CUP of the second level, the attack row register 320 may not store the row address RA.

In an embodiment, the attack row register 320 have a queue size of 1, and may store only one row address RA. In this case, upon receiving the update signal CUP of the first level, the attack row register 320 may replace the stored row address with the row address RA.

The attack row register 320 may output the attack row address ARA in response to the TRR command FREF_EN of the first level (e.g., high level). The attack row register 320 may transfer the attack row address ARA to the victim row determiner 330.

The victim row determiner 330 may determine the victim row address VRA based on the attack row address ARA. For example, the victim row determiner 330 may determine an address corresponding to at least one row adjacent to a row corresponding to the attack row address ARA as the victim row address VRA. In an embodiment, the victim row determiner 330 may determine at least one address among rows at ±1 positions based on the attack row address ARA as the victim row address VRA. In an embodiment, the victim row determiner 330 may determine at least one address among rows belonging to a range of ±x (x is an integer larger than 1) based on the attack row address ARA as the victim row address VRA. The victim row determiner 330 may output the victim row address VRA.

Figure 4:
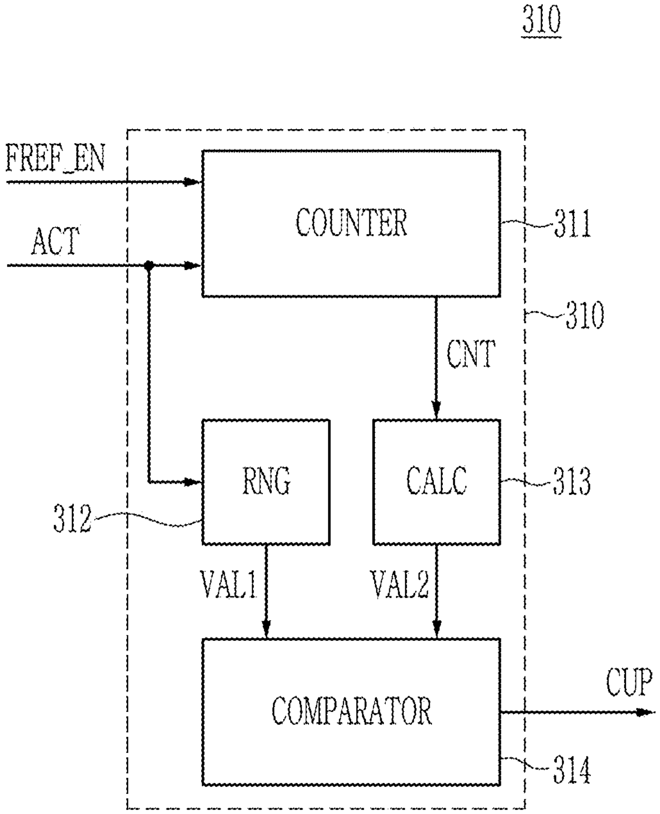
FIG. 4 is a block diagram of an attack row selector according to an embodiment.

FIG. 4 is a block diagram of an attack row selector according to an embodiment.

Referring to FIG. 4, the attack row selector 310 according to an embodiment may generate the update signal CUP based on the TRR command FREF_EN and the activation signal ACT. In an embodiment, the attack row selector 310 may include a counter 311, a random number generator (RNG) 312, a reference value generator (CALC) 313, and a comparator 314.

The counter 311 may receive the TRR command FREF_EN and the activation signal ACT. The counter 311 may count the number of received activation signals ACT and output a counting value CNT. The number of activation signals ACT may be understood as the accumulation value. For example, the counter 311 may count the number of received activation signals ACT from the time point of receiving the TRR command FREF_EN of the first level to a current time point. The counter 311 may transfer the counting value CNT to a reference value generator 313. Upon receiving the TRR command FREF_EN of the first level, the counting counter 311 may initialize the value CNT. The counter 311 may count the number of activation signals ACT received after the TRR command FREF_EN.

The random number generator 312 may receive the activation signal ACT. The random number generator 312 may generate the first value VAL1 that is a random number when the activation signal ACT is received. Depending on the embodiment, the random number generator 312 may be a true random number generator (TRNG), or a pseudo random number generator (PRNG). For example, the random number may be a true random number or a pseudo random number. In an embodiment, when the random number generator 312 is PRNG, the random number generator 312 may be implemented as a linear feedback shift register (LFSR). In an embodiment, the random number generator 312 may generate the first value VAL1, which is a real number in the range of 0 to 1. In an embodiment, the random number generator 312 may generate the first value VAL1, which is an integer in a range of 0 to the maximum value. In an embodiment, when the random number generator 312 is n-bit LFSR, the maximum value may be $2^n-1$ (n is an integer larger than 1).

The reference value generator 313 may generate the second value VAL2 that is a reference value based on the counting value CNT. In an embodiment, the reference value generator 313 may generate the reciprocal 1/CNT of the counting value CNT as the second value VAL2. For example, the reference value generator 313 may generate '1' as the second value VAL2 upon receiving a first activation signal ACT, and generate '1/9' as the second value VAL2 upon receiving a ninth activation signal ACT. For example, the second value VAL2 may have a range of above 0 and below 1. In an embodiment, the reference value generator 313 may generate '(a maximum value that may be generated from the random number generator 312)/the counting value CNT' as the second value VAL2.

The comparator 314 may receive the first value VAL1 and the second value VAL2. The comparator 314 may compare magnitudes of the first value VAL1 with the second value VAL2. In an embodiment, the comparator 314 may compare the first value VAL1 in the range of 0 to 1 with the second value VAL2 of 1/the counting value CNT. In an embodiment, the comparator 314 may compare the first value VAL1 in a range of 0 to the maximum value with the second value VAL2 of '(a maximum value that may be generated from the random number generator 312)/the counting value CNT'.

The comparator 314 may generate the update signal CUP based on the comparison result. For example, when the first value VAL1 is smaller than (or smaller than or equal to) the second value VAL2, the comparator 314 may generate the update signal CUP of the first level. When the first value is greater than or equal to (or greater than) the second value, the comparator 314 may generate the update signal CUP of the second level. The comparator 314 may transfer the update signal CUP to the attack row register 320 FIG. 2.

Figure 5:
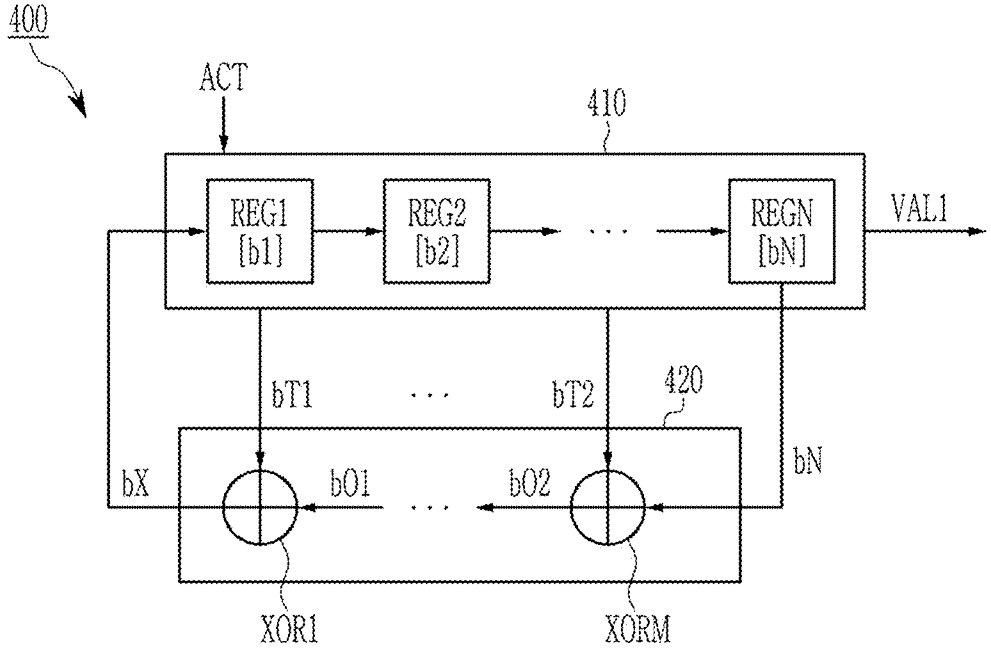
FIG. 5 is a block diagram of a linear feedback shift register according to an embodiment.

FIG. 5 is a block diagram a linear feedback shift register according to an embodiment.

Referring to FIG. 5, a linear feedback shift register 400 according to an embodiment may include a register circuit 410 and a logical operation circuit 420. The linear feedback shift register 400 may be understood as a random bit generator.

The linear feedback shift register 400 may determine a feedback bit based on a characteristic polynomial having a coefficient of 0 or 1. In the linear feedback shift register 400, the register circuit 410 and the logical operation circuit 420 may be designed based on the characteristic polynomial. For example, when the characteristic polynomial is $x^{10}+x^7+x^2+1$, the register circuit 410 may include first to tenth registers, and the logical operation circuit 420 may include first and second logic circuits. For example, in FIG. 5, N may be 10, and M may be 2. The first to tenth registers and the first and second logic circuits may be connected to satisfy the characteristic polynomial. The output of the seventh and tenth registers among the first to tenth registers may be transferred to the second logic circuit, and the output of the second logic circuit and the output of the second register may be transferred to the first logic circuit. The output of the first logic circuit may be transferred to the first register.

The register circuit 410 may output feedback bits (bN) bT1 to bT2 based on an input bit. The register circuit 410 may output the feedback bits (bN) bT1 to bT2 to a feedback path of the linear feedback shift register 400. The logical operation circuit 420 may perform logical operation based on the feedback bits (bN) bT1 to bT2 and generate calculation bits (bX) bO1 to bO2. A calculation bit bX finally generated by the logical operation circuit 420 may be input to the register circuit 410 as the input bit. The linear feedback shift register 400 may perform the shift operation based on the bit input to an input terminal, to generate a pseudo-random number sequence.

The register circuit 410 may include first to N-th registers REG1 to REGN (N is an integer larger than 1). The first to N-th registers REG1 to REGN may each store first to N-th bits b1 to bN. Bit values of the first to N-th bits b1 to bN may vary depending on the shift operation.

The logical operation circuit 420 may receive the feedback bits (bN) bT1 to bT2 from the register circuit 410, and perform logical operation based on the feedback bits (bN) bT1 to bT2. The logical operation circuit 420 may include first to M-th logic circuits XOR1 to XORM (M is an integer larger than 1). The first to M-th logic circuits XOR1 to XORM may perform an exclusive OR (XOR) calculation.

An output terminal of a M-th logic circuit XORM may be connected to an M−1-th logic circuit, and the first logic circuit XOR1 may be connected to an output terminal of the second logic circuit. For example, the first logic circuit XOR1 among the first to M-th logic circuits XOR1 to XORM may perform the calculation last, and the calculation result of the first logic circuit XOR1 may be input to the first register REG1.

The first to M-th logic circuits XOR1 to XORM may be connected along the feedback path, and may transfer the calculation result to a front-side logic circuit. For example, the M-th logic circuit XORM may be connected to an output terminal of a N-th register REGN. The M-th logic circuit XORM may be further connected to an output terminal of one of the first to N−1-th registers. An output terminal of the N−1-th register may be connected to the N-th register REGN.

The M-th logic circuit XORM may receive a feedback bit bN from the N-th register REGN, and receive a feedback bit bT2 from one of the first to N−1-th registers. The M-th logic circuit XORM may perform a logical operation on the feedback bit bN and the feedback bit bT2, and generate a calculation bit bO2. The first logic circuit XOR1 may receive a calculation bit bO1 from a back-side logic circuit, and receive a feedback bit bT1 from one of the first to N−1-th registers. The calculation bit bO1 may be a bit generated by a logical operation based on the calculation bit bO2. The first logic circuit XOR1 may perform a logical operation on the calculation bit bO1 and the feedback bit bT1, and generate the calculation bit bX. The first logic circuit XOR1 may transfer the calculation bit bX to the first register REG1.

The first register REG1 may store the calculation bit bX input through the feedback path as a first bit b1. The bit input through the feedback path may be shifted through the first to N-th registers REG1 to REGN based on a control signal.

The linear feedback shift register 400 may output the first value VAL1 through the register circuit 410. Upon receiving the activation signal ACT, the linear feedback shift register 400 may output the first value VAL1. The first value VAL1 may be a random binary code having a predetermined number of bits. For example, the linear feedback shift register 400 may output a random binary code having N bits based on the first to N-th bits b1 to bN stored in the first to N-th registers REG1 to REGN.

Figure 6:
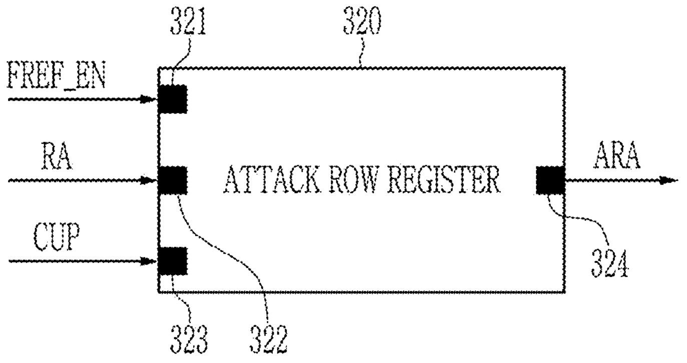
FIG. 6 is a block diagram of an attack row register according to an embodiment.

FIG. 6 is a block diagram of an attack row register according to an embodiment.

Referring to FIG. 6, the attack row register 320 according to an embodiment may include a plurality of terminals 321 to 324. The attack row register 320 may store a row address. The attack row register 320 according to an embodiment may have a queue size of 1, and may store only one row address (referred to as a "register address").

The attack row register 320 may receive the TRR command FREF_EN, the row address RA, and the update signal CUP. For example, the attack row register 320 may receive the TRR command FREF_EN through a first terminal 321, receive the row address RA through a second terminal 322, and receive the update signal CUP through a third terminal 323. The row address RA may be an address corresponding to the activation signal ACT of FIG. 3 to FIG. 5.

The attack row register 320 may determine whether to store the row address RA based on the update signal CUP. In an embodiment, upon receiving the update signal CUP of the first level (e.g., high level), the attack row register 320 may store the row address RA. Upon receiving the update signal CUP of the second level (e.g., low level), the attack row register 320 may not store the row address RA. Upon receiving the update signal CUP of the second level, the attack row register 320 may maintain the stored register address.

The attack row register 320 may determine whether to output the register address in response to the TRR command FREF_EN. In an embodiment, upon receiving the TRR command FREF_EN of the first level (e.g., high level), the attack row register 320 may output the register address. Upon receiving the TRR command FREF_EN of the second level (e.g., low level), the attack row register 320 may not output the register address. In an embodiment, the second level of the TRR command FREF_EN may be a low level, but embodiment is not limited thereto. For example, the attack row register 320 may continue to maintain or change (update) the register address until the TRR command FREF_EN of the first level is received.

The attack row register 320 may output the register address as the attack row address ARA through a fourth terminal 324. The attack row register 320 may transfer the attack row address ARA to the victim row determiner 330 of FIG. 3.

Figure 7:
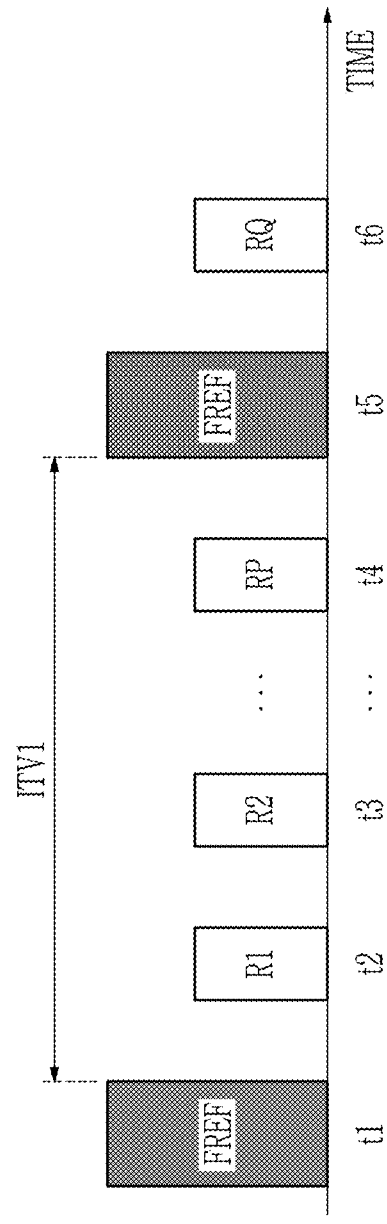
FIG. 7 is a timing diagram for explaining a refresh operation performed by a memory device according to an embodiment.

FIG. 7 is a timing diagram for explaining a refresh operation performed by a memory device according to an embodiment.

Referring to FIG. 7, a memory device according to an embodiment may perform a refresh FREF at time points t1 and t5. The refresh FREF may mean TRR. The memory device may periodically perform the refresh FREF. For example, the memory device may perform the refresh FREF at a period of time interval ITV1. For example, the memory device may perform the refresh FREF in response to the TRR command FREF_EN.

The memory device may perform the refresh FREF at the time point t1, and then receive an activation signal and a row address corresponding to the activation signal. For example, the memory device may receive first to P-th activation signals (P is an integer larger than 1) and first to P-th row addresses R1 to RP at time points t2 to t4, respectively.

The memory device may determine a row address (i.e., the victim row address) that is a target of the refresh FREF at the time point t5. For example, the memory device may determine one of first to P-th row addresses R1 to RP as the attack row address. The memory device may determine the victim row address based on the attack row address. The memory device may determine an address corresponding to at least one row adjacent to a row corresponding to the attack row address as the victim row address.

In an embodiment, the memory device may determine the attack row address when receiving the activation signal. For example, the memory device may determine the attack row address at each of the time points t2 to t4. The memory device may determine the row address received first after performing the refresh FREF as the attack row address. For example, the memory device may determine a first row address R1 at the time point t2 as the attack row address. The memory device may determine one among first and second row addresses R1 and R2 as the attack row address at the time point t3. For example, the memory device may determine whether the attack row address shall be changed to a second row address R2 at the time point t3. The memory device may determine whether the attack row address shall be changed to a P-th row address RP at the time point t4.

The memory device may generate a random number and a reference value at each of the time points t2 to t4. The memory device may compare magnitudes of the random number with the reference value at each of the time points t2 to t4, and determine the attack row address based on the comparison result. For example, the memory device may determine a reference value based on the number of activation signals received after the refresh FREF. The memory device may generate a random number by using a random number generator. In an embodiment, the random number generator may be implemented as a linear feedback shift register. Magnitude comparison of the memory device will be later described with reference to FIG. 7 to FIG. 9.

The memory device may determine the victim row address based on the attack row address the time point t5. The memory device may perform the refresh FREF based on the victim row address.

The memory device may perform the refresh FREF at the time point t5, and then receive a Q-th activation signal and a Q-th row address RQ corresponding to the Q-th activation signal at a time point t6 (Q is an integer larger than P). The memory device may determine the Q-th row address RQ of the time point t6 as the attack row address.

In an embodiment, the memory device may determine the attack row address at the time point t5. The memory device may store all row addresses received within the time interval ITV1. For example, the memory device may store the first to P-th row addresses R1 to RP respectively received at the time points t2 to t4. For example, the memory device may store the first to P-th row addresses R1 to RP to the register. The size of the register may be determined based on a maximum value of the number of row addresses which the memory device may receive within the time interval ITV1 (or the number of activation signals).

The memory device may determine one among the first to P-th row addresses R1 to RP stored in the register at the time point t5 as the attack row address. The memory device may output the attack row address and initialize the register after outputting the attack row address.

The memory device may determine the victim row address based on the attack row address at the time point t5. The memory device may perform the refresh FREF based on the victim row address.

The memory device may perform the refresh FREF at the time point t5, and then receive the Q-th activation signal and the Q-th row address RQ corresponding to the Q-th activation signal at the time point t6. The memory device may store the Q-th row address RQ in the register at the time point t6. Herein, each of the time points t1 and t5 may be referred to as a period of time during which the refresh FREF is performed, or a time point at which the TRR command FREF_EN is received.

Figure 8:
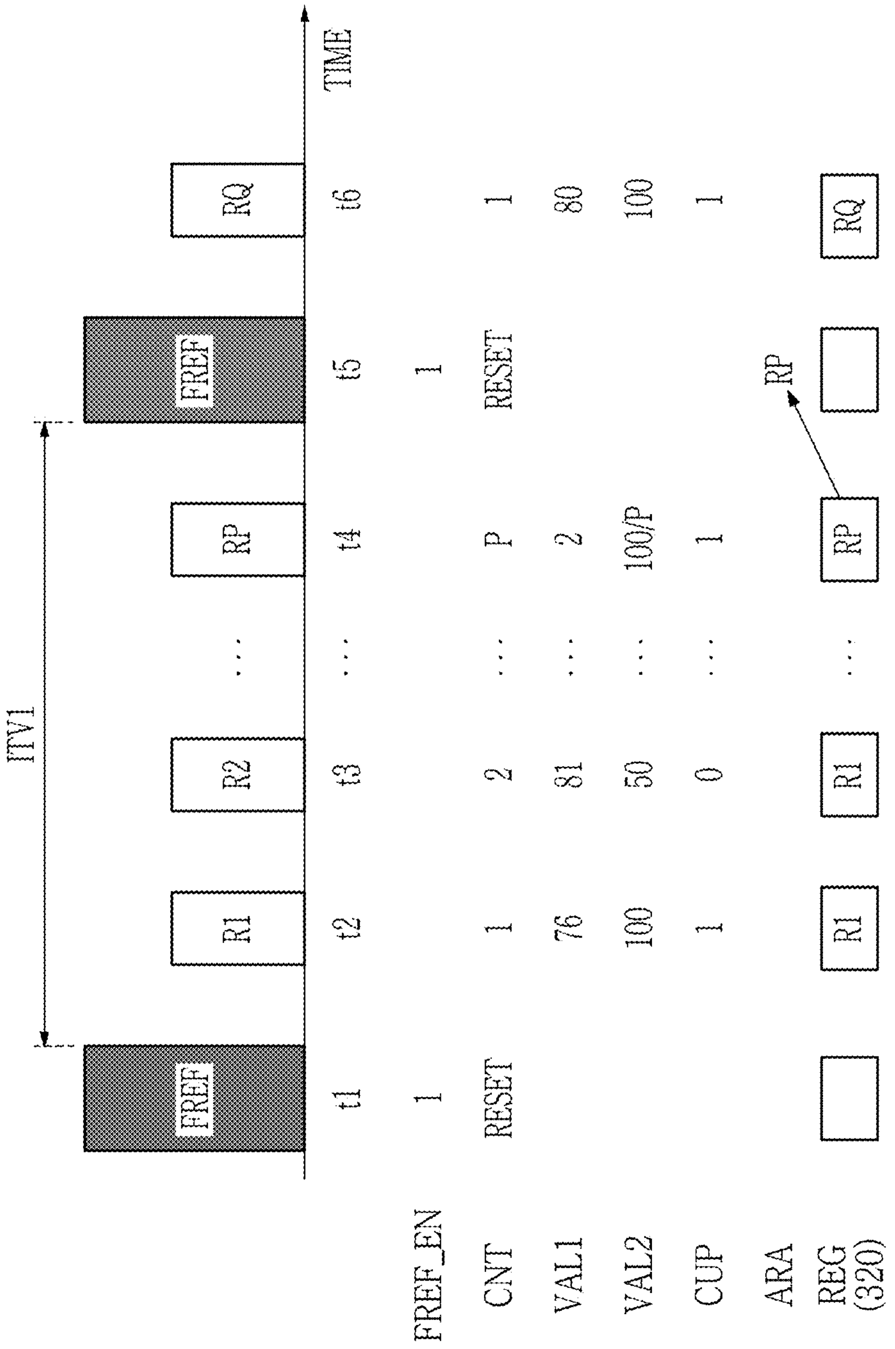
FIG. 8 is a timing diagram for explaining an operation of a memory device according to an embodiment to determine an attack row address.

FIG. 8 is a timing diagram for explaining an operation of a memory device according to an embodiment to determine the attack row address.

Referring to FIG. 8, a memory device according to an embodiment may perform the refresh FREF at time points t1 and t5. The refresh FREF may mean TRR. The memory device may periodically perform the refresh FREF. For example, the memory device may perform the refresh FREF at a period of the time interval ITV1.

In an embodiment, the memory device may generate the TRR command FREF_EN at a period of the time interval ITV1, and perform the refresh FREF based on the TRR command FREF_EN. The memory device may generate the TRR command FREF_EN based on a command from a memory controller. For example, the memory controller may transmit the refresh command to the memory device at the time point t1, and the memory device may generate the TRR command FREF_EN from the time point t1 at the period of the time interval ITV1. The memory device may perform the refresh FREF based on the TRR command FREF_EN of the high level.

A memory device according to an embodiment may include an attack row selector configured to select an attack row, an attack row register REG (e.g., 320 of FIG. 3) configured to store the attack row address, and a victim row determiner configured to determine the victim row address based on the attack row address. The attack row selector may include a counter, a random number generator, a reference value generator, and a comparator. Regarding components included in the memory device, the contents described with reference to FIG. 3 to FIG. 6 may be equally applied thereto.

The counter may operate based on the TRR command FREF_EN and the activation signal. The counter may count the number of activation signals, so as to generate the counting value CNT. For example, the counter may set the counting value CNT as '1' based on the first activation signal at a time point t2. In the same way, the counter may increase the counting value CNT whenever receiving the activation signal at time points t3 to t4. The counter may initialize the counting value CNT based on the TRR command FREF_EN of the high level.

The random number generator may generate the first value VAL1 that is a random number when the activation signal is received. The random number generator may generate '76' upon receiving the activation signal at the time point t2, generate '81' upon receiving the activation signal at the time point t3, and generate '2' upon receiving the activation signal at the time point t4.

The random number generator may set a maximum value of the random number that may be generated. For example, the random number generator may generate an integer in the range of 0 to the maximum value. In an embodiment, the maximum value of the random number may be determined based on a length of the time interval ITV1. For example, when the time interval ITV1 is long, the maximum value of the random number may be relatively large, and when the time interval ITV1 is short, the maximum value of the random number may be relatively small. The memory device may determine the maximum value of the number of activation signals that may be processed within the time interval ITV1. The memory device may set the maximum value of the random number based on the maximum value of the number of activation signals. In an embodiment, the memory device may set the maximum value of the number of activation signals as the maximum value of the random number.

In an embodiment, the random number generator may be implemented as a linear feedback shift register (LFSR). When the random number generator is n-bit LFSR, the maximum value of the random number generator may be $2^n-1$. The memory device may determine n based on the maximum value of the random number, and implement the n-bit LFSR.

The reference value generator may generate the second value VAL2 based on the counting value CNT. For example, the reference value generator may generate '(the maximum value of the random number)/the counting value CNT' as the second value VAL2. In FIG. 8, the maximum value of the random number may be determined to be 100. For example, the reference value generator may generate '100' at the time point t2, generate '50' at the time point t3, and generate '100/P' at the time point t4 (P is an integer larger than 1).

The comparator may compare the first value VAL1 with the second value VAL2. The comparator may generate the update signal CUP according to the comparison result. For example, when the first value VAL1 is smaller than (or smaller than or equal to) the second value VAL2, the comparator may generate the update signal CUP of the high level. When the first value VAL1 is greater than or equal to (or greater than) the second value VAL2, the comparator may generate the update signal CUP of the low level. The comparator may compare '76' with '100' at the time point t2, and output '1'. The comparator may compare '81' with '50' at the time point t3, and output '0'. The comparator may compare '2' with '100/P' at the time point t4 and output '1'.

The attack row register REG may receive a row address (R1 to RP and RQ) corresponding to the activation signal. In an embodiment, the attack row register REG may have a queue size of 1 and may store only one row address. The attack row register REG may store a row address based on the update signal CUP. When the row address is stored in the queue, the attack row register REG may replace an existing row address with a newly received row address.

Upon receiving the update signal CUP of the high level, the attack row register REG may store the row address of the time point at which the update signal CUP of the high level is received. Upon receiving the update signal CUP of the low level, the attack row register REG may maintain the existing row address. For example, the attack row register REG may store the row address R1 in response to the update signal CUP of the high level at the time point t2. The attack row register REG may maintain the row address R1 in response to the update signal CUP of the low level at the time point t3. The attack row register REG may store the row address RP in response to the update signal CUP of the high level at the time point t4. For example, the attack row register REG may replace the existing row address with the row address RP at the time point t4.

The attack row register REG may output the attack row address ARA in response to the TRR command FREF_EN of the high level. For example, the attack row register REG may output the row address RP stored in response to the TRR command FREF_EN of the high level at the time point t5 as the attack row address ARA.

In an embodiment, when the attack row address ARA is output at the time point t5, the attack row register REG may initialize the stored row address. In an embodiment, when the attack row address ARA is output at the time point t5, the attack row register REG may maintain the stored row address. The attack row register REG may receive the row address RQ and the update signal CUP at a time point t6. The attack row register REG may store the row address RQ in response to the update signal CUP of the high level at the time point t6. Herein, each of the time points t1 and t5 may be referred to as a period of time during which the refresh FREF is performed, or a time point at which the TRR command FREF_EN is received.

Figure 9:
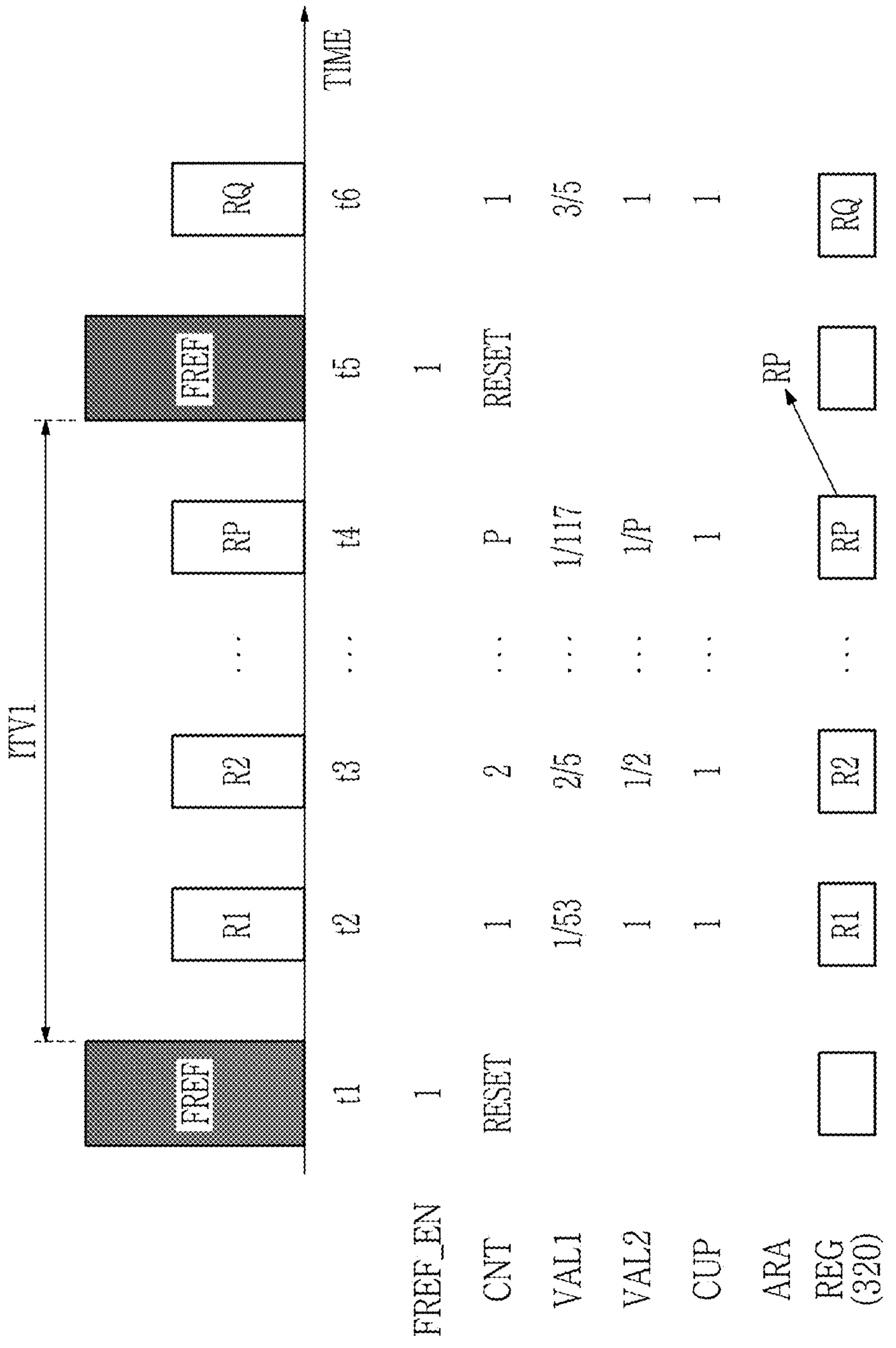
FIG. 9 is a timing diagram for explaining an operation of a memory device according to an embodiment to determine an attack row address.

FIG. 9 is a timing diagram for explaining an operation of a memory device according to an embodiment to determine the attack row address.

Referring to FIG. 9, a memory device according to an embodiment may perform the refresh FREF at time points t1 and t5. The refresh FREF may mean TRR. The memory device may periodically perform the refresh FREF. For example, the memory device may perform the refresh FREF at a period of the time interval ITV1.

In an embodiment, the memory device may generate the TRR command FREF_EN at a period of the time interval ITV1, and perform the refresh FREF based on the TRR command FREF_EN. The memory device may generate the TRR command FREF_EN based on a command from a memory controller. For example, the memory controller may transmit the refresh command to the memory device at the time point t1, and the memory device may generate the TRR command FREF_EN from the time point t1 at the period of the time interval ITV1. The memory device may perform the refresh FREF based on the TRR command FREF_EN of the high level.

A memory device according to an embodiment may include the attack row selector configured to select an attack row, the attack row register REG (e.g., 320 of FIG. 3) configured to store the attack row address, and a victim row determiner configured to determine the victim row address based on the attack row address. The attack row selector may include the counter, the random number generator, the reference value generator, and the comparator. Regarding components included in the memory device, the contents described with reference to FIG. 3 to FIG. 6 may be equally applied thereto.

The counter may operate based on the TRR command FREF_EN and the activation signal. The counter may count the number of activation signals, so as to generate the counting value CNT. For example, the counter may set the counting value CNT as '1' based on the first activation signal at a time point t2. In the same way, the counter may increase the counting value CNT whenever receiving the activation signal at time points t3 to t4. The counter may initialize the counting value CNT based on the TRR command FREF_EN of the high level.

The random number generator may generate the first value VAL1 that is a random number when the activation signal is received. The random number generator may generate the first value VAL1, which is a real number in the range of 0 to 1. The random number generator may generate '1/53' upon receiving the activation signal at the time point t2, generate '2/5' upon receiving the activation signal at the time point t3, and generate '1/117' upon receiving the activation signal at the time point t4.

In an embodiment, the random number generator may generate the first value VAL1 based on the maximum value of the number of activation signals. The memory device may determine the maximum value of the number of activation signals that may be processed within the time interval ITV1. The random number generator may set '1/(the maximum value of the number of activation signals)' as a minimum value. For example, the random number generator may generate a random number in the range of '1/(the maximum value of the number of activation signals)' to 1.

The reference value generator may generate the second value VAL2 based on the counting value CNT. For example, the reference value generator may generate '1/the counting value CNT' as the second value VAL2. For example, the reference value generator may generate '1' at the time point t2, generate '1/2' at the time point t3, and generate '1/P' at the time point t4 (P is an integer larger than 1).

The comparator may compare the first value VAL1 with the second value VAL2. The comparator may generate the update signal CUP according to the comparison result. For example, when the first value VAL1 is smaller than (or smaller than or equal to) the second value VAL2, the comparator may generate the update signal CUP of the high level. When the first value VAL1 is greater than or equal to (or greater than) the second value VAL2, the comparator may generate the update signal CUP of the low level. The comparator may compare '1/53' with '1' at the time point t2 and output '1'. The comparator may compare '2/5' with '1/2' at the time point t3 and output '1'. The comparator may compare '1/117' with '1/P' at the time point t4 and output '1'.

The attack row register REG may receive the row address (R1 to RP and RQ) corresponding to the activation signal. In an embodiment, the attack row register REG may have a queue size of 1 and may store only one row address. The attack row register REG may store row address based on the update signal CUP. When the row address is stored in the queue, the attack row register REG may replace an existing row address with a newly received row address.

Upon receiving the update signal CUP of the high level, the attack row register REG may store the row address of the time point at which the update signal CUP of the high level is received. Upon receiving the update signal CUP of the low level, the attack row register REG may maintain the existing row address. For example, the attack row register REG may store the row address R1 in response to the update signal CUP of the high level at the time point t2. The attack row register REG may store the row address R2 in response to the update signal CUP of the high level at the time point t3. The attack row register REG may store the row address RP in response to the update signal CUP of the high level at the time point t4. That is, the attack row register REG may replace the existing row address at the time point t3, and t4.

The attack row register REG may output the attack row address ARA in response to the TRR command FREF_EN of the high level. For example, the attack row register REG may output the row address RP stored in response to the TRR command FREF_EN of the high level at the time point t5 as the attack row address ARA.

In an embodiment, when the attack row address ARA is output at the time point t5, the attack row register REG may initialize the stored row address. In an embodiment, when the attack row address ARA is output at the time point t5, the attack row register REG may maintain the stored row address. The attack row register REG may receive the row address RQ and the update signal CUP at a time point t6. The attack row register REG may store the row address RQ in response to the update signal CUP of the high level at the time point t6. Herein, each of the time points t1 and t5 may be referred to as a period of time during which the refresh FREF is performed, or a time point at which the TRR command FREF_EN is received.

Figure 10:
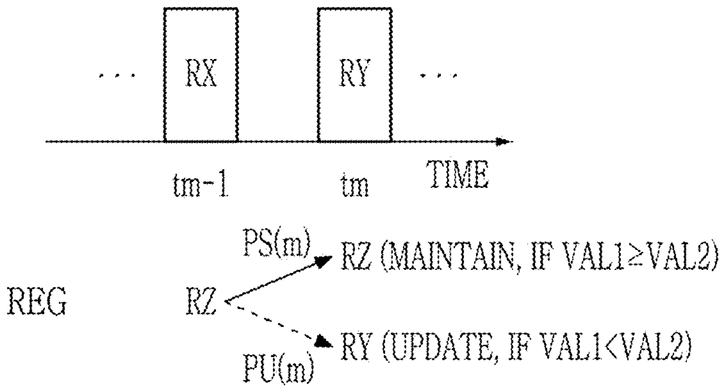
FIG. 10 is a drawing for explaining an operation of an attack row register according to an embodiment.

FIG. 10 is a drawing for explaining an operation of an attack row register according to an embodiment.

Referring to FIG. 10, the attack row register REG (e.g., 320 of FIG. 3) according to an embodiment may receive row address RX at a time point tm−1. The attack row register REG may receive a conversion signal (e.g., update signal CUP) generated based on the first value VAL1 and the second value VAL2. Here, the first value VAL1 may be a random number generated by the random number generator (e.g., 312 of FIG. 4). The second value VAL2 may be a reference value generated by the reference value generator (e.g., 313 of FIG. 4) based on a counting value of the activation signal. The attack row register REG may maintain a previously stored row address RZ in response to the conversion signal of the low level.

The attack row register REG may receive a row address RY at a time point tm. When the first value VAL1 is greater than or equal to (or greater than) the second value VAL2, the attack row register REG may receive the conversion signal of the low level, and maintain the previously stored the row address RZ. When the first value VAL1 is smaller than (or smaller than or equal to) the second value VAL2, the attack row register REG may receive the conversion signal of the high level, and replace the previously stored row address RZ with the row address RY.

The attack row register REG may maintain the row address with a probability PS(m) at the time point tm. The probability PS(m) may be associated with the number of activation signals received from an immediately previous TRR time point to the time point tm. For example, when m activation signals are received until the time point tm, the probability PS(m) may be '1−(1/m)'.

The attack row register REG may replace the row address with a probability PU(m) at the time point tm. The probability PU(m) may be associated with the number of activation signals received from the immediately previous TRR time point to the time point tm. For example, when m activation signals are received until the time point tm, the probability PU(m) may be '1/m'.

The sum of the probability PS(m) and the probability PU(m) may be 1. For example, the attack row register REG may maintain or replace the row address RZ at the time point tm.

Figure 11:
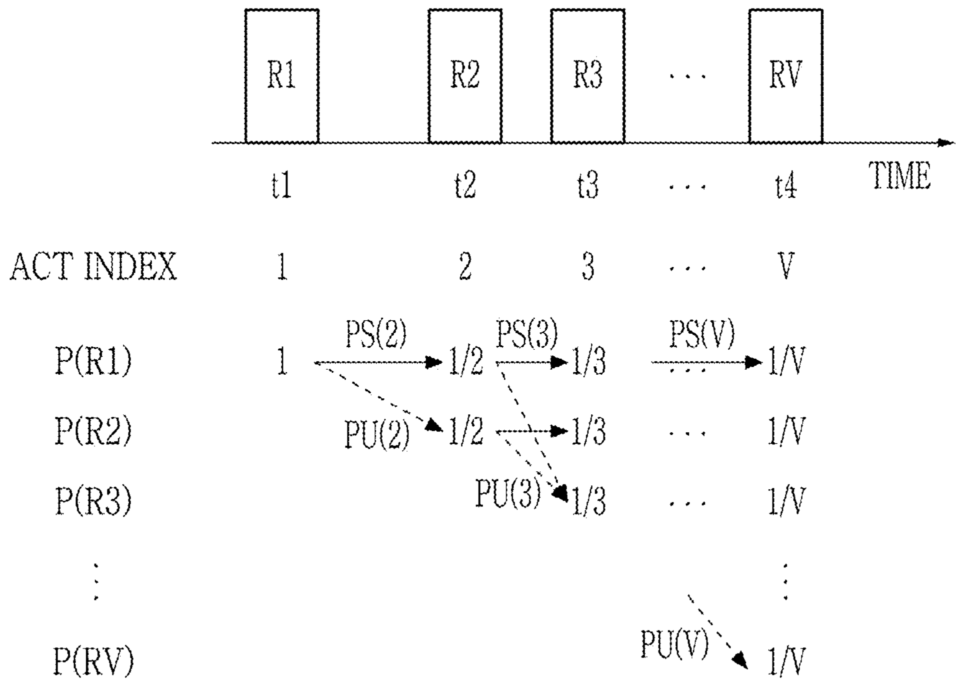
FIG. 11 is a drawing for explaining an operation of an attack row register according to an embodiment.

FIG. 11 is a drawing for explaining an operation of an attack row register according to an embodiment.

Referring to FIG. 11, a memory device according to an embodiment may receive an activation signal and row addresses R1 to RV corresponding to the activation signal respectively at time points t1 to t4. Each the activation signals may be distinguished by an index ACT INDEX. The time point t1 may be a time point at which the activation signal is received for the first time. In an embodiment, the time point t1 may be the time point of receiving the activation signal first time after immediately previous TRR.

The memory device may determine one among the row addresses R1 to RV as the attack row address at the time points t1 to t4, and include an attack row register storing the attack row address. The attack row register may store one row address. Hereinafter, a configuration in which the memory device determines and stores the attack row address will be described by using a trellis analysis technique.

The memory device may receive the row address R1 at the time point t1. The memory device may determine the row address R1 as the attack row address at the time point t1. The memory device may receive the row address R2 at the time point t2. The memory device may maintain the attack row address as the row address R1 with a probability PS(2) at the time point t2. The memory device may replace the attack row address with the row address R2 with a probability PU(2) at the time point t2. At this time, the probability PS(2) and the probability PU(2) may be ½ for both. For example, at the time point t2, the probability P(R1) that the attack row address is the row address R1 may be ½, and the probability P(R2) that the attack row address is the row address R2 may be ½.

The memory device may receive the row address R3 at the time point t3. The memory device may maintain the existing attack row address (e.g., R1 or R2) with a probability PS(3) at the time point t3. The memory device may replace the attack row address with the row address R3 with a probability PU(3) at the time point t3. At this time, the probability PS(3) may be ⅔, and the probability PU(3) may be ⅓. For example, at the time point t3, the probability P(R1) that the attack row address is the row address R1 may be ⅓ (i.e., PS(2)*PS(3)), the probability that the attack row address is the row address R2 may be ⅓ (i.e., PU(2)*PS(3)), and the probability P(R3) that the attack row address is the row address R3 may be ⅓ (i.e., PS(2)*PU(3)+PU(2)*PU(3)).

As such, the memory device may receive a row address RV corresponding to a V-th activation signal at the time point t4. The memory device may maintain the existing the attack row address with a probability PS(V), and may replace the existing attack row address with the row address RV with a probability PU(V). Accordingly, the probability P(R1) to P(RV) that the memory device determines each row address as the attack row address at the time point t4 may be all the same as 1/V.

For example, when the row addresses R1 to RV are all different, the memory device may determine each row addresses R1 to RV as the attack row address based on the same probability at each of the time points t1 to t4. When at least two of the row addresses R1 to RV are the same, the memory device may determine the same address as the attack row address with a relatively high probability. For example, when the row address R1 and the row address R3 are the same, the memory device may determine the row address R1 as the attack row address with a probability of 2/V at the time point t4.

As such, the memory device may always perform the refresh at the refresh time point by determining the received row address as the attack row address even if only one row address is received. In addition, the memory device may provide robust defense performance with respect to various attack patterns by selecting one of the received row addresses with a substantially equivalent probability.

Figure 12:
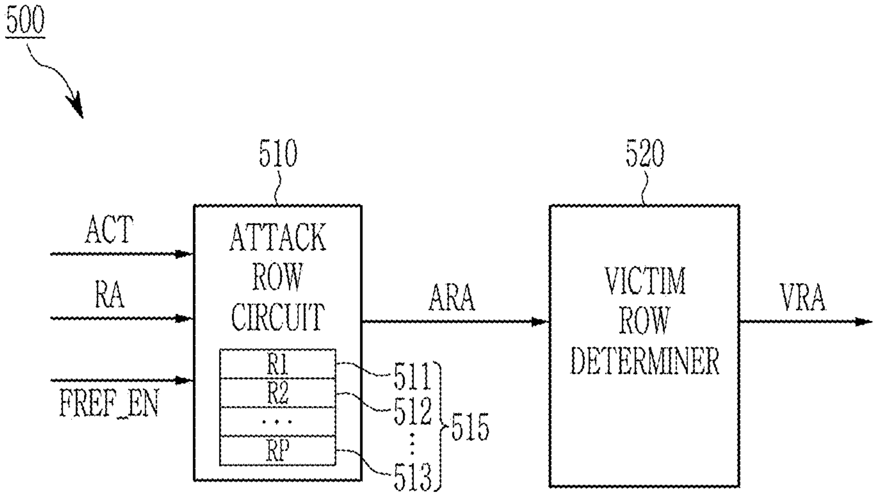
FIG. 12 is a block diagram of a TRR control circuit according to an embodiment.

FIG. 12 is a block diagram of a TRR control circuit according to an embodiment.

Referring to FIG. 12, a TRR control circuit 500 according to an embodiment may determine the victim row address VRA based on the TRR command FREF_EN, and the row address RA. The TRR control circuit 500 may correspond to the TRR control circuit 291 of FIG. 2 and the TRR control circuit 300 of FIG. 3. In an embodiment, the TRR control circuit 500 may include an attack row circuit 510 and a victim row determiner 520. The attack row circuit 510 may determine the attack row address, and the victim row determiner 520 may determine the victim row address.

The attack row circuit 510 may receive the TRR command FREF_EN, the activation signal ACT and the row address RA. The time point at which the attack row circuit 510 receives the TRR command FREF_EN and the row address RA may vary. For example, the attack row circuit 510 may receive the TRR command FREF_EN at a first time point, and receive the row address RA at a second time point. Depending on the embodiment, the first time point may be earlier or later than the second time point. The row address RA may be an address corresponding to the activation signal.

The attack row circuit 510 may include a plurality of queues 515. The plurality of queues 515 may include first to P-th queues 511 to 513. The attack row circuit 510 may have a queue size of P. The queue size of the attack row circuit 510 may be determined based on the maximum value of the number of activation signals that may be received within the TRR interval. In an embodiment, the queue size may be substantially equivalent to the maximum value of the number of activation signals that may be received within the TRR interval. In an embodiment, the queue size may be larger than the maximum value of the number of activation signals that is received within the TRR interval.

The attack row circuit 510 may respectively store the row addresses R1 to RP in the first to P-th queues 511 to 513.

The attack row circuit 510 may determine the attack row address ARA in response to the TRR command FREF_EN of the first level. For example, upon receiving the TRR command FREF_EN of the first level, the attack row circuit 510 may determine one of the row addresses R1 to RP stored in the first to P-th queues 511 to 513 as the attack row address ARA. The attack row circuit 510 may transfer the attack row address ARA to the victim row determiner 520.

The attack row circuit 510 may perform initialization based on the TRR command FREF_EN of the first level. For example, when the attack row address ARA is transferred to the victim row determiner 520 the attack row circuit 510 may erase the row addresses R1 to RP stored in the first to P-th queues 511 to 513.

The victim row determiner 520 may determine the victim row address VRA based on the attack row address ARA. For example, the victim row determiner 520 may determine an address corresponding to at least one row adjacent to a row corresponding to the attack row address ARA as the victim row address VRA. In an embodiment, the victim row determiner 520 may determine at least one address corresponding to a victim row among rows at ±1 positions based on the attack row address ARA as the victim row address VRA. In an embodiment, the victim row determiner 520 may determine at least one address corresponding to a victim row among rows belonging to a range of ±x (x is an integer larger than 1) based on the attack row address ARA as the victim row address VRA. The victim row determiner 520 may output the victim row address VRA.

Figure 13:
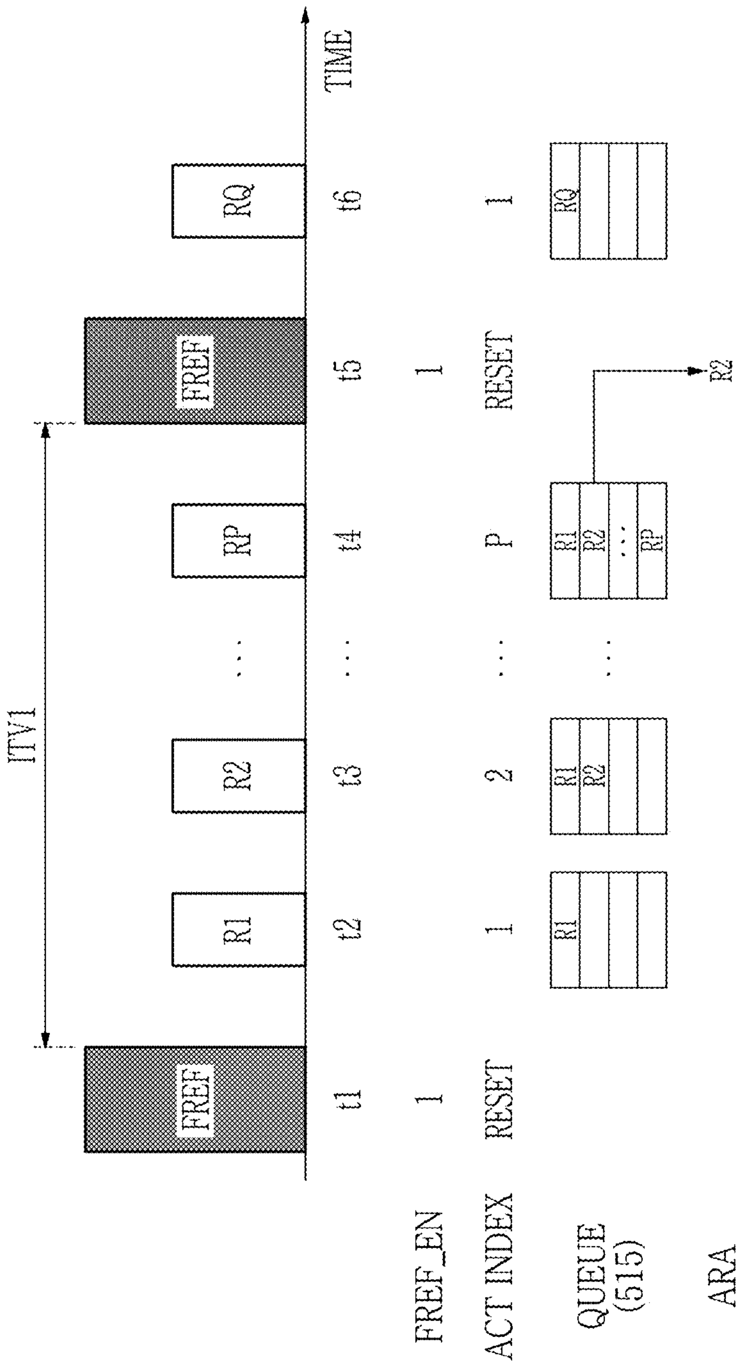
FIG. 13 is a timing diagram for explaining an operation of a memory device according to an embodiment to determine an attack row address.

FIG. 13 is a timing diagram for explaining an operation of a memory device according to an embodiment to determine the attack row address.

Referring to FIG. 13, a memory device according to an embodiment may perform the refresh FREF at time points t1 and t5. The refresh FREF may mean TRR. The memory device may periodically perform the refresh FREF. For example, the memory device may perform the refresh FREF at a period of the time interval ITV1.

In an embodiment, the memory device may generate the TRR command FREF_EN at a period of the time interval ITV1, and perform the refresh FREF based on the TRR command FREF_EN. The memory device may generate the TRR command FREF_EN based on a command from a memory controller. For example, the memory controller may transmit the refresh command to the memory device at the time point t1, and the memory device may generate the TRR command FREF_EN from the time point t1 at the period of the time interval ITV1. The memory device may perform the refresh FREF based on the TRR command FREF_EN of the high level.

A memory device according to an embodiment may include an attack row circuit (e.g., 510 of FIG. 12) configured to store the attack row address and a victim row determiner configured to determine the victim row address based on the attack row address. Regarding components included in the memory device, the contents described with reference to FIG. 12 may be equally applied thereto.

The attack row register may receive the row address (R1 to RP and RQ) corresponding to the activation signal. In an embodiment, the attack row register may have a queue size of P and may store P row addresses. The queue size may be determined based on the maximum value of the number of activation signals that may be processed within the time interval ITV1. The attack row register may store the row address (R1 to RP and RQ).

The attack row register may include the plurality of queues 515 storing the row address R1 to RP and RQ. The attack row register may store the row addresses R1 to RP respectively received at the time point t1 and time points t2 to t4 in the plurality of queues 515.

The attack row register may output the attack row address ARA in response to the TRR command FREF_EN of the high level. For example, the attack row register may output one (e.g., the row address R2) of the row addresses R1 to RP stored in the plurality of queues 515 as the attack row address ARA, in response to the TRR command FREF_EN of the high level at a time point t5. Herein, each of the time points t1 and t5 may be referred to as a period of time during which the refresh FREF is performed, or a time point at which the TRR command FREF_EN is received.

When the attack row address ARA is output, the attack row register may initialize the plurality of queues 515. The attack row register may store the row address RQ received at a time point t6 in the plurality of queues 515.

Figure 14:
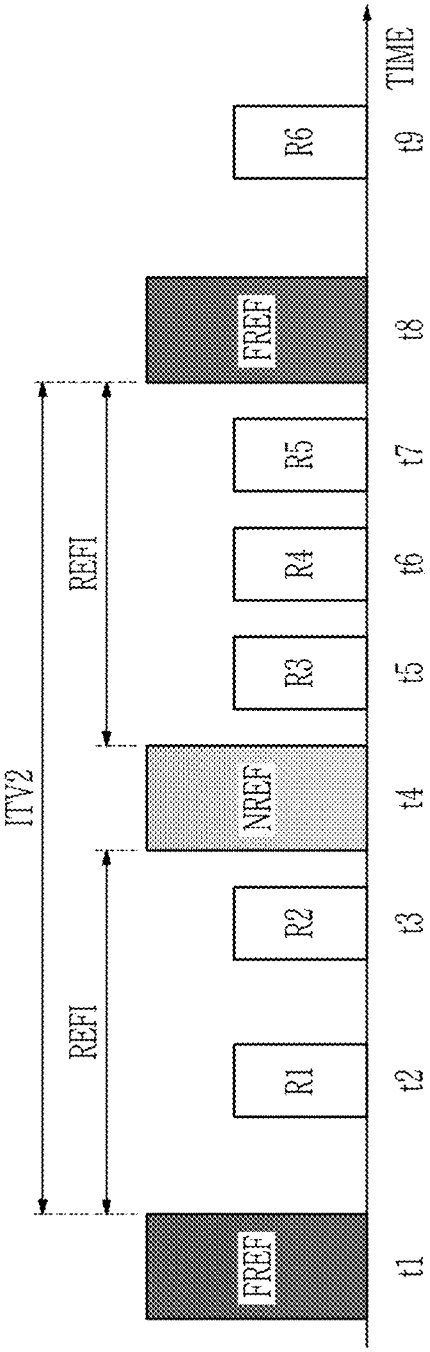
FIG. 14 is a timing diagram for explaining a refresh operation performed by a memory device according to an embodiment.

FIG. 14 is a timing diagram for explaining a refresh operation performed by a memory device according to an embodiment.

Referring to FIG. 14, a memory device according to an embodiment may perform the refresh FREF at time points t1 and t8, and perform a refresh NREF at a time point t4. The refresh FREF may mean the TRR, and the refresh NREF may mean the normal refresh. The memory device may periodically perform the refresh FREF and the refresh NREF. For example, the memory device may perform the refresh NREF in response to the normal refresh command. Herein, the time point t4 may be referred to as a period of time during which the refresh NREF is performed, or a time point at which the normal refresh command is received.

In an embodiment, the memory device may determine a ratio of the refresh NREF and the refresh FREF. For example, the memory device may determine the refresh ratio between the refresh FREF and the refresh NREF to be 1:1. The memory device may perform the refresh FREF or the refresh NREF at a period of a time interval REFI. The time interval REFI may correspond to a maximum average refresh interval tREFI of Joint Electron Device Engineering Council (JEDEC) standard. The memory device may perform the refresh FREF at a period of a time interval ITV2. The time interval ITV2 may be determined based on the time interval REFI and refresh ratio. For example, when the refresh ratio between the refresh FREF and the refresh NREF is 1:a (a is an integer greater than or equal to 1), the time interval ITV2 may be larger than '(the time interval REFI)×a+1'. In the example of FIG. 14, the time interval ITV2 may be larger than '(the time interval REFI)×2'.

The memory device may perform the refresh FREF at the time point t1, and then receive an activation signal and a row address corresponding to the activation signal. For example, the memory device may receive first and second activation signals and the first and second row addresses R1 and R2 at time points t2 and t3.

The memory device may perform the refresh NREF at the time point t4. For example, the memory device may perform the refresh NREF based on the row address NRA generated from the normal refresh control circuit 292 of FIG. 2. In an embodiment, the memory device may determine the number of row addresses NRA based on refresh ratio. When the ratio of the refresh FREF is increased (i.e., when a ratio of the refresh NREF is decreased), the memory device may increase the number of row addresses NRA. For example, the number of row addresses NRA on which the refresh NREF is performed at the time point t4 may be relatively increased. When the ratio of the refresh FREF is decreased (i.e., the ratio of the refresh NREF is increased), the memory device may decrease the number of row addresses NRA. For example, the number of row addresses NRA on which the refresh NREF is performed at the time point t4 may be relatively decreased.

The memory device may perform the refresh NREF at the time point t4, and then receive an activation signal and a row address corresponding to the activation signal. For example, the memory device may receive third to fifth activation signals and third to fifth row addresses R3 to R5 at time points t5 to t7.

The memory device may determine a row address (i.e., the victim row address) that is a target of the refresh FREF at a time point t8. For example, the memory device may determine one of the activation row addresses R1 to R5 received from an immediately previous refresh FREF to a current refresh FREF (i.e., in a period within the time interval ITV2) as the attack row address. The memory device may determine the victim row address based on the attack row address. The memory device may determine an address corresponding to at least one row adjacent to a row corresponding to the attack row address as the victim row address.

In an embodiment, the memory device may determine the attack row address when receiving the activation signal. For example, the memory device may determine the attack row address at each of the time points t2, t3, and t5-t7. The memory device may determine the row address received first after the refresh FREF as the attack row address. The memory device may determine the first row address R1 at the time point t2 as the attack row address. The memory device may determine one among the first and second row addresses R1 and R2 as the attack row address at the time point t3. For example, the memory device may determine whether the attack row address shall be changed to the second row address R2 at the time point t3. In the same way, the memory device may determine whether the attack row address shall be changed to the row addresses R3 to R5 at each of the time points t5 to t7.

The memory device may generate a random number and a reference value at each of the time points t2, t3, and t5-t7. The memory device may generate a random number based on the time interval ITV2. For example, the memory device may determine the maximum value of the number of activation signals that may be received in an operation range within the time interval ITV2 excluding the refresh NREF (i.e., '(the time interval REFI)×2'). In an embodiment, the memory device may determine a maximum value based on a count of the refresh NREF within the time interval ITV2. For example, when the count of the refresh NREF within the time interval ITV2 is e (e is an integer larger than 1), the memory device may determine the maximum value of the number of activation signals based on '(the time interval REFI)×(e+1)'.

The memory device may determine a minimum value or maximum value of a random number based on the maximum value of the number of activation signals. Regarding the configuration in which the memory device determines the minimum value or maximum value of the random number, the contents described with reference to FIG. 8 or FIG. 9 may be equally applied thereto.

The memory device may compare magnitudes of the random number with the reference value at each of the time points t2, t3, and t5-t7, and determine the attack row address based on the comparison result. For example, the memory device may determine the reference value based on the number of activation signals received after the refresh FREF. The memory device may generate a random number by using the random number generator. In an embodiment, the random number generator may be implemented as a linear feedback shift register. Regarding the magnitude comparison of the memory device, the contents described with reference to FIG. 7 to FIG. 9 may be equally applied thereto.

The memory device may determine the victim row address based on the attack row address at the time point t8. The memory device may perform the refresh FREF based on the victim row address.

The memory device may perform the refresh FREF at the time point t8, and then receive a sixth activation signal and the sixth row address R6 corresponding to the sixth activation signal at a time point t9. The memory device may determine the sixth row address R6 of the time point t9 as the attack row address.

In an embodiment, the memory device may determine the attack row address at the time point t8. The memory device may store all row addresses received within the time interval ITV2. For example, the memory device may store the first to fifth row addresses R1 to R5 received at the time points t2, t3, and t5-t7, respectively. For example, the memory device may store the first to fifth row addresses R1 to R5 to the register. The size of the register may be determined based on a maximum value of the number of row addresses which the memory device may receive within the time interval ITV2 (or the number of activation signals).

The memory device may determine one of the first to fifth row addresses R1 to R5 stored in the register at the time point t8 as the attack row address. The memory device may output the attack row address and initialize the register.

The memory device may determine the victim row address based on the attack row address at the time point t8. The memory device may perform the refresh FREF based on the victim row address.

The memory device may perform the refresh FREF at the time point t8, and then receive the sixth activation signal and the sixth row address R6 corresponding to the sixth activation signal at the time point t9. The memory device may store the sixth row address R6 in the register at the time point t9. Herein, each of the time points t1 and t8 may be referred to as a period of time during which the refresh FREF is performed, or a time point at which the TRR command FREF_EN is received.

Figure 15:
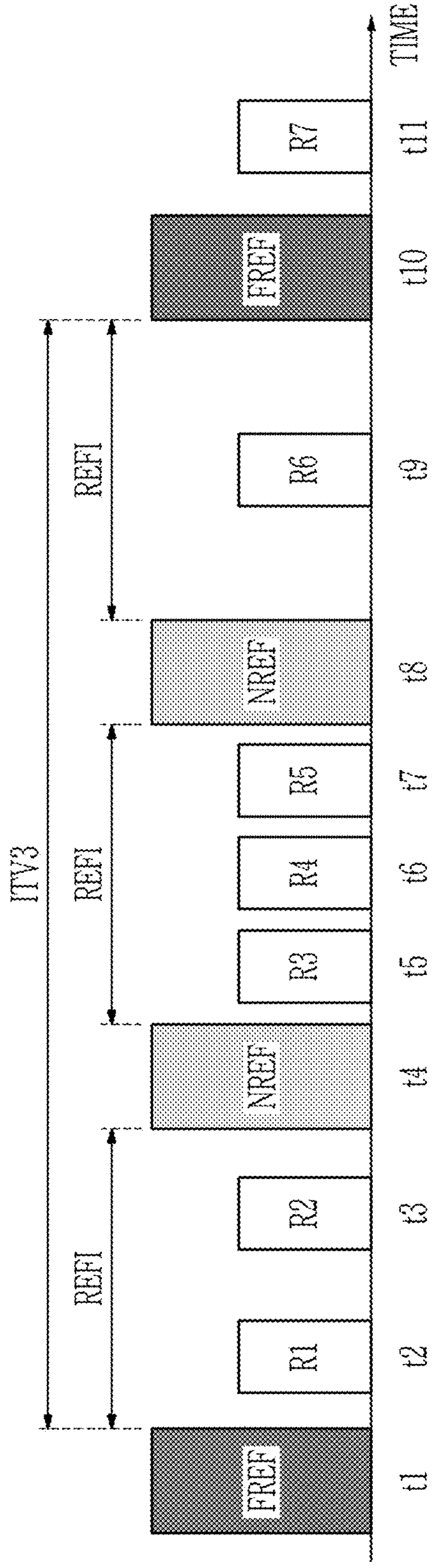
FIG. 15 is a timing diagram for explaining a refresh operation performed by a memory device according to an embodiment.

FIG. 15 is a timing diagram for explaining a refresh operation performed by a memory device according to an embodiment.

Referring to FIG. 15, a memory device according to an embodiment may perform the refresh FREF at time points t1 and t10, and perform the refresh NREF at time points t4 and t8. The refresh FREF may mean the TRR, and the refresh NREF may mean the normal refresh. The memory device may periodically perform the refresh FREF and the refresh NREF.

In an embodiment, the memory device may determine a ratio of the refresh FREF and the refresh NREF. For example, the memory device may determine a refresh ratio between the refresh FREF and the refresh NREF to be 1:2. The memory device may perform the refresh FREF or the refresh NREF at a period of the time interval REFI. The time interval REFI may correspond to the maximum average refresh interval tREFI of the JEDEC standard. The memory device may perform the refresh FREF at a period of a time interval ITV3. The time interval ITV3 may be determined based on the time interval REFI and refresh ratio. For example, when the refresh ratio between the refresh FREF and the refresh NREF is 1:a (a is an integer greater than or equal to 1), the time interval ITV3 may be larger than '(the time interval REFI)×(a+1)'. In the example of FIG. 15, the time interval ITV3 may be larger than '(the time interval REFI)×3'.

The memory device may perform the refresh FREF at the time point t1, and then receive an activation signal and a row address corresponding to the activation signal. For example, the memory device may receive first and second activation signals and the first and second row addresses R1 and R2 at time points t2 and t3.

The memory device may perform the refresh NREF at the time points t4 and t8. For example, the memory device may perform the refresh NREF based on the row address NRA generated from the normal refresh control circuit 292 of FIG. 2. In an embodiment, the memory device may determine the number of row addresses NRA based on a refresh ratio. When the ratio of the refresh FREF is increased (i.e., when the ratio of the refresh NREF is decreased), the memory device may increase the number of row addresses NRA. Accordingly, the number of row addresses NRA on which the refresh NREF is performed at the time points t4 and t8 may be relatively increased. When the ratio of the refresh FREF is decreased (i.e., the ratio of the refresh NREF is increased), the memory device may decrease the number of row addresses NRA. For example, when performing the refresh NREF, the memory device of FIG. 15 may refresh a greater number of rows than the memory device of FIG. 14.

The memory device may perform the refresh NREF at the time points t4 and t8, and then receive an activation signal and a row address corresponding to the activation signal. Herein, each of the time points t4 and t8 may be referred to as a period of time during which the refresh NREF is performed, or a time point at which the normal refresh command is received. For example, the memory device may receive the third to the sixth activation signals and the third to sixth row addresses R3 to R6 at time points t5 to t7 and t9.

The memory device may determine a row address (i.e., the victim row address) that is a target of the refresh FREF at a time point t10. For example, the memory device may determine one of the activation row addresses R1 to R6 received from the immediately previous refresh FREF to the current refresh FREF (i.e., in a period within the time interval ITV3) as the attack row address. The memory device may determine the victim row address based on the attack row address. The memory device may determine an address corresponding to at least one row adjacent to a row corresponding to the attack row address as the victim row address.

In an embodiment, the memory device may determine the attack row address when receiving the activation signal. For example, the memory device may determine the attack row address at each of the time points t2, t3, t5-t7, and t9. The memory device may determine the row address received first after the refresh FREF as the attack row address. The memory device may determine the first row address R1 at the time point t2 as the attack row address. The memory device may determine one among the first and second row addresses R1 and R2 as the attack row address at the time point t3. For example, the memory device may determine whether the attack row address shall be changed to the second row address R2 at the time point t3. In the same way, the memory device may determine whether the attack row address shall be changed to the row address R3 to R6 at each of the time points t5 to t7, and t9.

The memory device may generate a random number and a reference value at each of the time points t2, t3, t5-t7, and t9. The memory device may generate a random number based on the time interval ITV3. For example, the memory device may determine the maximum value of the number of activation signals that may be received in an operation range within the time interval ITV3 excluding the refresh NREF (i.e., '(the time interval REFI)×3').

In an embodiment, the memory device may determine a maximum value based on count of the refresh NREF within the time interval ITV3. For example, when the count of the refresh NREF within the time interval ITV3 is e (e is an integer larger than 1), the memory device may determine a maximum value based on '(the time interval REFI×(e+1)'.

The memory device may determine a minimum value or maximum value of a random number based on the maximum value of the number of activation signals. Regarding the configuration in which the memory device determines the minimum value or maximum value of the random number, the contents described with reference to FIG. 8 or FIG. 9 may be equally applied thereto.

The memory device may compare magnitudes of the random number with the reference value at each of the time points t2, t3, t5-t7, and t9, and determine the attack row address based on the comparison result. For example, the memory device may determine a reference value based on the number of activation signals received after the refresh FREF. The memory device may generate a random number by using the random number generator. In an embodiment, the random number generator may be implemented as a linear feedback shift register. Regarding magnitude comparison of the memory device, the contents described with reference to FIG. 7 to FIG. 9 may be equally applied thereto.

The memory device may determine the victim row address based on the attack row address at the time point t10. The memory device may perform the refresh FREF based on the victim row address.

The memory device may perform the refresh FREF at the time point t10, and then receive a seventh activation signal and a seventh row address R7 corresponding to the seventh activation signal at a time point t11. The memory device may determine the seventh row address R7 at the time point t11 as the attack row address.

In an embodiment, the memory device may determine the attack row address at the time point t10. The memory device may store all row addresses received within the time interval ITV3. For example, the memory device may store first to sixth row addresses R1 to R6 received at the time points t2, t3, t5-t7, and t9, respectively. For example, the memory device may store first to sixth row addresses R1 to R6 to the register. The size of the register may be determined based on a maximum value of the number of row addresses which the memory device may receive within the time interval ITV3 (or the number of activation signals).

The memory device may determine one among first to sixth row addresses R1 to R6 stored in the register at the time point t10 as the attack row address. The memory device may output the attack row address and initialize the register.

The memory device may determine the victim row address based on the attack row address at the time point t10. The memory device may perform the refresh FREF based on the victim row address.

The memory device may perform the refresh FREF at the time point t10, and then receive a seventh activation signal and a seventh row address R7 corresponding to the seventh activation signal at the time point t11. The memory device may store the seventh row address R7 in the register at the time point t11. Herein, each of the time points t1 and t10 may be referred to as a period of time during which the refresh FREF is performed, or a time point at which the TRR command FREF_EN is received.

Figure 16:
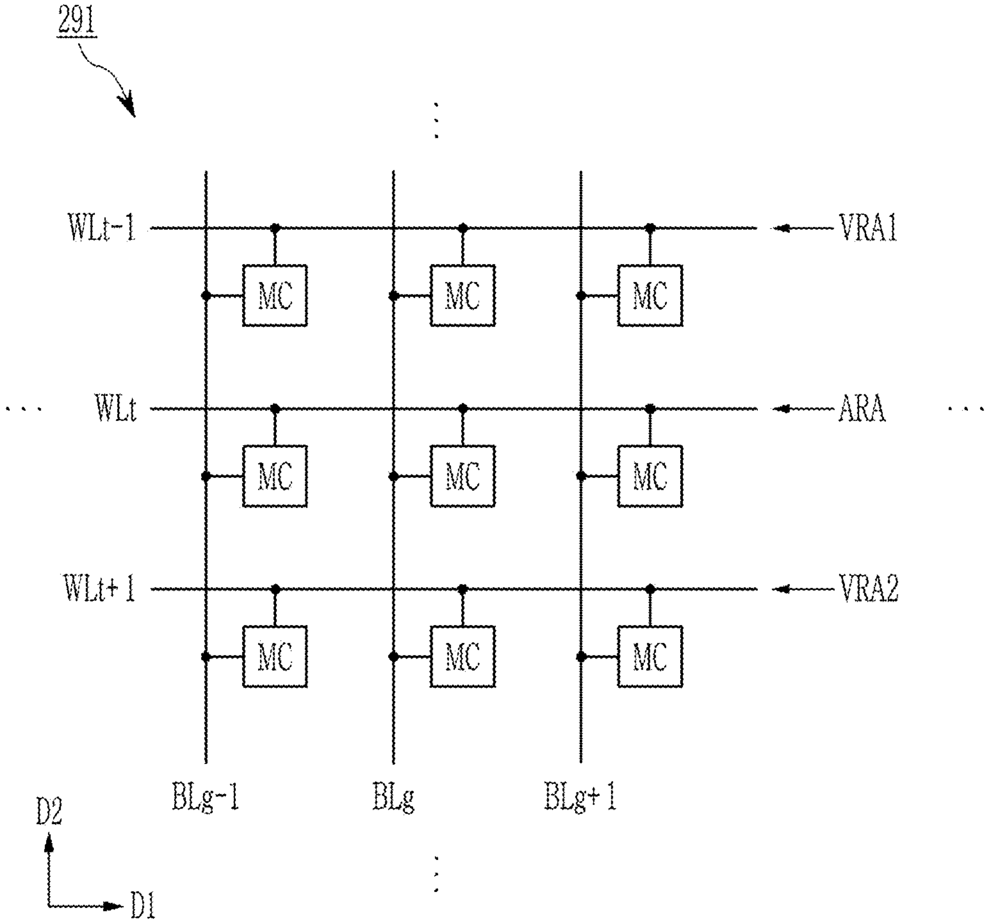
FIG. 16 shows a portion of a memory cell array in order to explain an operation of a victim row determiner according to an embodiment to determine a victim row address based on an attack row address.

FIG. 16 shows a portion of a memory cell array in order to explain an operation of a victim row determiner according to an embodiment to determine the victim row address based on the attack row address.

Referring to FIG. 16, in a memory cell array 291, the drawing shows three wordlines WLt−1, WLt, and WLt+1 extending in a row direction (first direction) D1 and sequentially arranged to be adjacent in a column direction (second direction) D2, three bitlines BLg−1, BLg, and BLg+1 extending in the column direction D2 and sequentially arranged to be adjacent in the row direction D1, and the memory cells MC connected thereto respectively.

At this time, a wordline WLt among the wordlines WLt−1, WLt, and WLt+1 may correspond to the attack row address ARA that is intensively accessed. Being intensively accessed means that an activation (active) count of the wordline is large or an activation frequency is high. When a hammer wordline WLt is accessed and activated and precharged, that is, when the voltage of the hammer wordline WLt increased and decreased, due to coupling phenomenon occurring between adjacent wordlines WLt−1 and WLt+1, the voltages of the adjacent wordlines WLt−1 and WLt+1 also increase and decrease, such that the cell charge charged in the memory cells MC connected to the adjacent wordlines WLt−1 and WLt+1 is affected. As the hammer wordline WLt is accessed more frequently, the possibility that cell charges of the memory cells MC connected to victim wordlines WLt−1 and WLt+1 are lost and the stored data is damage may be increased.

The victim row determiner 330 of FIG. 3 may provide the victim row address VRA that represents addresses VRA1 and VRA2 of the wordlines WLt−1 and WLt+1 physically adjacent to the wordline WLt corresponding to the attack row address ARA. For example, by additionally performing the TRR operation with respect to the adjacent wordlines WLt−1 and WLt+1 based on the victim row address VRA in addition to the normal refresh, the memory device may prevent data damage of the memory cells due to intensive access.

Figure 17:
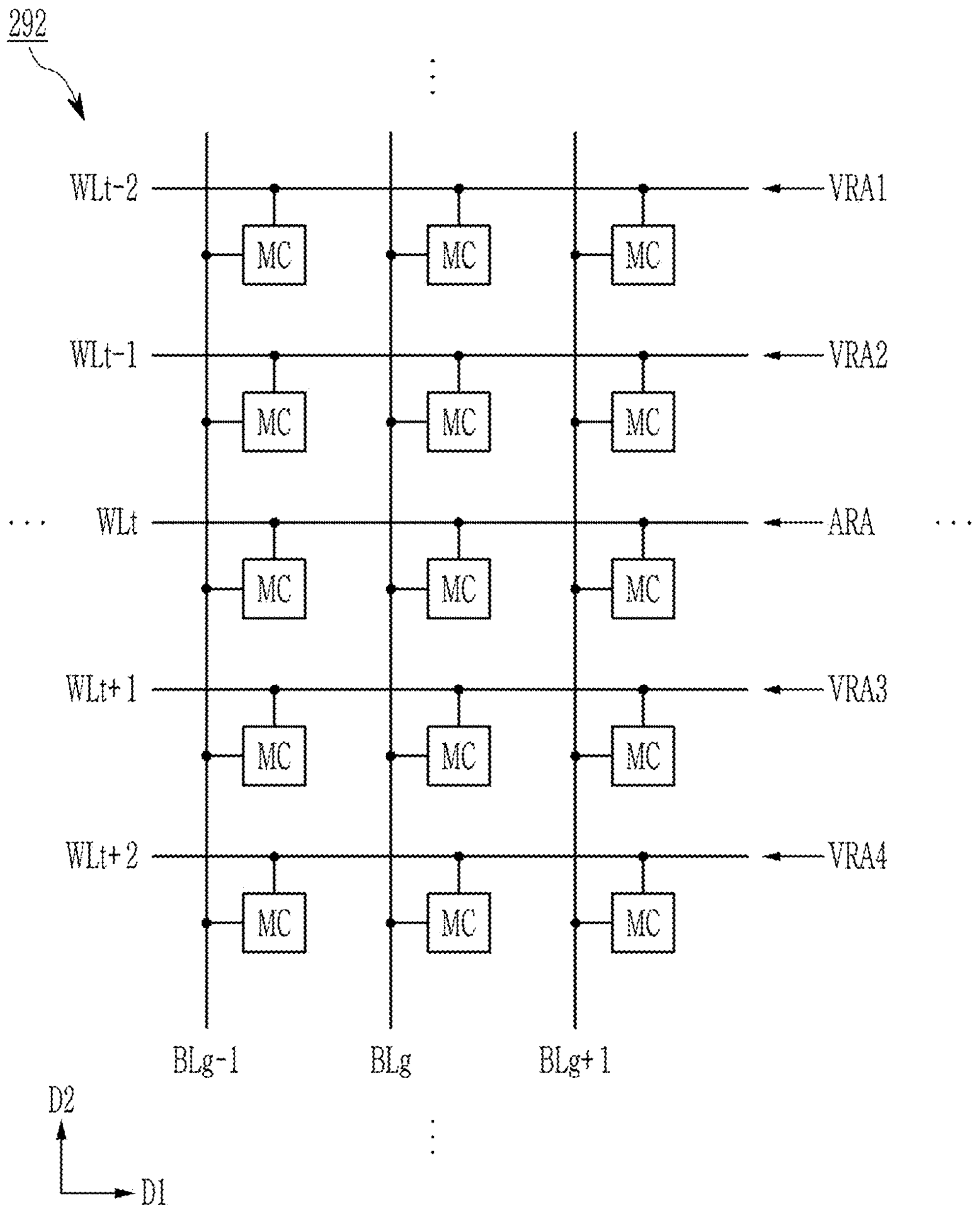
FIG. 17 shows a portion of a memory cell array in order to explain an operation of a victim row determiner according to an embodiment to determine a victim row address based on an attack row address.

FIG. 17 shows a portion of a memory cell array in order to explain an operation of a victim row determiner according to an embodiment to determine the victim row address based on the attack row address.

Referring to FIG. 17, in a memory cell array 292, the drawing shows five wordlines WLt−2, WLt−1, WLt, WLt+1, and WLt+2 extending in the row direction D1 and sequentially arranged to be adjacent in the column direction D2, the three bitlines BLg−1, BLg, and BLg+1 extending in the column direction D2 and sequentially arranged to be adjacent in the row direction D1, and the memory cells MC connected thereto respectively. At this time, the wordline WLt among the wordlines WLt−2, WLt−1, WLt, WLt+1, and WLt+2 may correspond to the attack row address ARA that is intensively accessed.

The victim row determiner 330 of FIG. 3 may provide the victim row address VRA that represents addresses VRA1 to VRA4 of wordlines WLt−2, WLt−1, WLt+1, and WLt+2 physically adjacent to the wordline WLt corresponding to the attack row address ARA. For example, by additionally performing the TRR operation with respect to the adjacent wordlines WLt−1, WLt+1, WLt−2, and WLt+2 based on the victim row address VRA in addition to the normal refresh, the memory device may prevent data damage of the memory cells due to intensive access.

Figure 18:
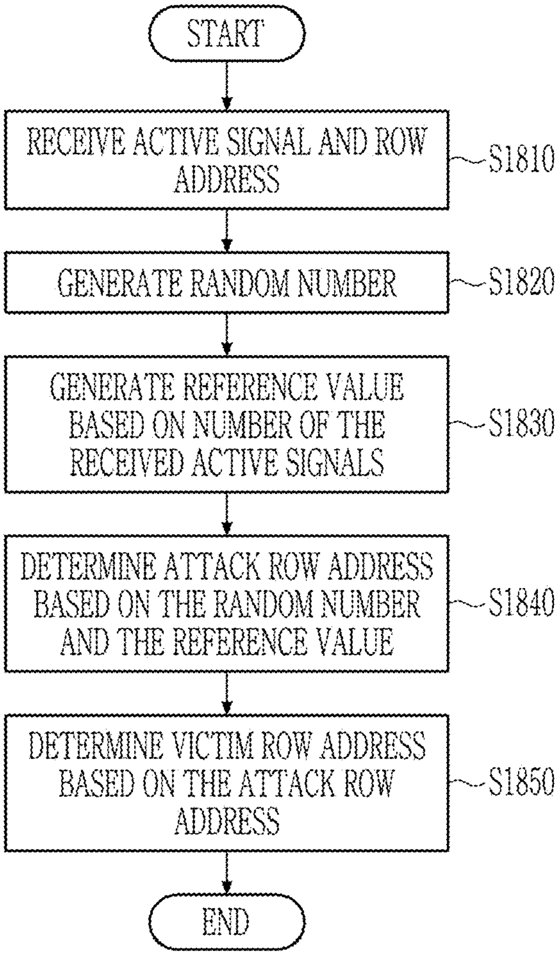
FIG. 18 is a flowchart of a refresh method according to an embodiment.

FIG. 18 is a flowchart of a refresh method according to an embodiment.

Referring to FIG. 18, refresh method according to an embodiment may be performed by the memory device.

At step S1810, the memory device may receive a first activation signal and a first activation row address corresponding to the first activation signal at a first time point. The memory device may calculate the number of activation row addresses (or activation signals) received from a time point at which the immediately previous TRR signal is received to the first time point. For example, the number of activation row addresses (or activation signals) may be calculated from a time point of receiving the TRR signal to the first time point. For example, the number of activation row addresses (or activation signals) may be calculated until the first time point after the previous TRR is performed.

At step S1820, upon receiving the first activation signal, memory device may generate the random number. In an embodiment, the maximum value of the random number may be determined based on an interval between two consecutive TRRs. For example, the memory device may determine the maximum value of the number of activation signals that may be received during the interval between the TRR. The memory device may set the maximum value of the random number to be substantially equivalent to the maximum value of the number of activation signals. The memory device may generate a random number by using a linear feedback shift register (LFSR). For example, if the random number generator includes n-bit LFSR, the maximum value of the random number generator may be $2^n-1$. In an embodiment, the memory device may generate a random number that is a real number in a range of 0 to 1.

At step S1830, the memory device may generate a reference value based on the number of activation signals received from the immediately previous TRR time point to the first time point. In an embodiment, the memory device may generate '(the maximum value of the number of activation signals)/(the number of activation signals)' as a reference value. In an embodiment, the memory device may generate '1/(the number of activation signals)' as a reference value.

At step S1840, the memory device may determine the attack row address based on a magnitude relationship between the random number and the reference value. For example, when the random number is smaller than (or smaller than or equal to) the reference value, the memory device may determine the first activation row address as the attack row address. When the random number is greater than (or greater than or equal to) the reference value, the memory device may maintain the existing attack row address.

At step S1850, the memory device may determine the victim row address based on the attack row address. The memory device may determine an address corresponding to a row (e.g., victim row) adjacent to a row (e.g., attack row) corresponding to the attack row address as the victim row address.

Figure 19:
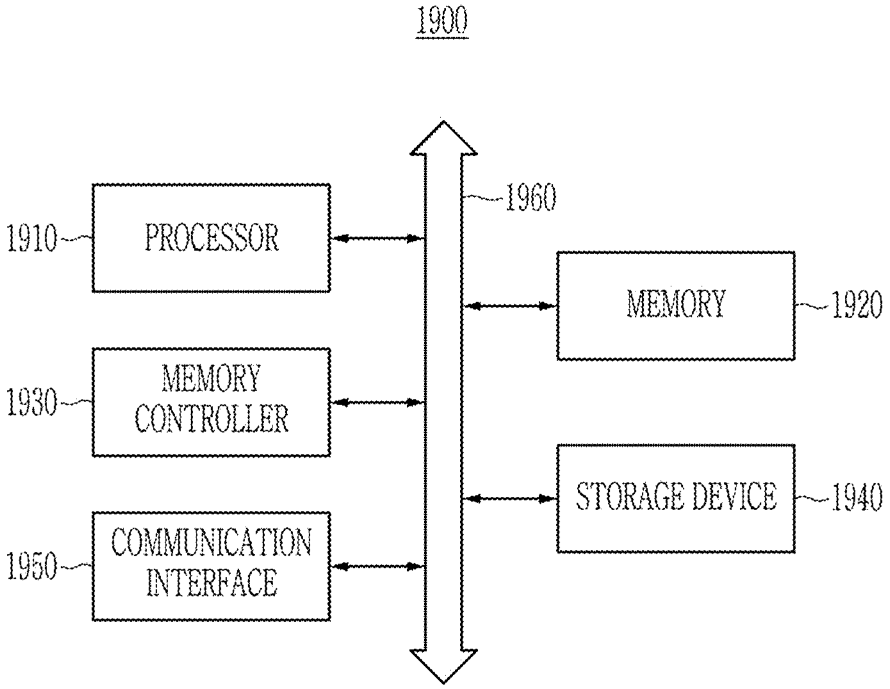
FIG. 19 is a block diagram a computing system according to an embodiment.

FIG. 19 is a block diagram a computing system according to an embodiment.

Referring to FIG. 19, a computing system 1900 according to an embodiment includes a processor 1910, a memory 1920, a memory controller 1930, a storage device 1940, a communication interface 1950, and a bus 1960. The computing system 1900 may further include other general-purpose components.

The processor 1910 controls the overall operation of each component of the computing system 1900. The processor 1910 may be implemented as at least one of various processing units such as a central processing unit (CPU), an application processor (AP), a graphic processing unit (GPU), and the like.

The memory 1920 stores various data and commands. The memory controller 1930 controls the transfer of data or commands to and from memory 1920. The memory 1920 and/or the memory controller 1930 may perform the refresh operation described with reference to FIG. 1 to FIG. 18. For example, the memory 1920 may perform the normal refresh or the TRR in response to a command from the memory controller 1930. For example, upon receiving the activation signal, the memory 1920 may count the number of received activation signals. Upon receiving the activation signal, the memory 1920 may generate the reference value based on a counted number. Upon receiving the activation signal, memory 1920 may generate the random number. The memory 1920 may compare the random number with the reference value, and determine the attack row address based on the comparison result. The memory 1920 may determine the victim row address corresponding to the victim row adjacent to the attack row corresponding to the attack row address, and perform the TRR by using the victim row address. In some embodiments, the memory controller 1930 may be provided as a separate chip from the processor 1910. In some embodiments, the memory controller 1930 may be provided as an internal component of the processor 1910.

The storage device 1940 non-temporarily stores programs and data. In an embodiment, the storage device 1940 may be implemented as a non-volatile memory. The communication interface 1950 supports wired and wireless Internet communication of the computing system 1900. In addition, the communication interface 1950 may support various communication methods other than Internet communication. The bus 1960 provides a communication function between components of the computing system 1900. The bus 1960 may include at least one type of bus according to a communication protocol between components.

Figure 20:
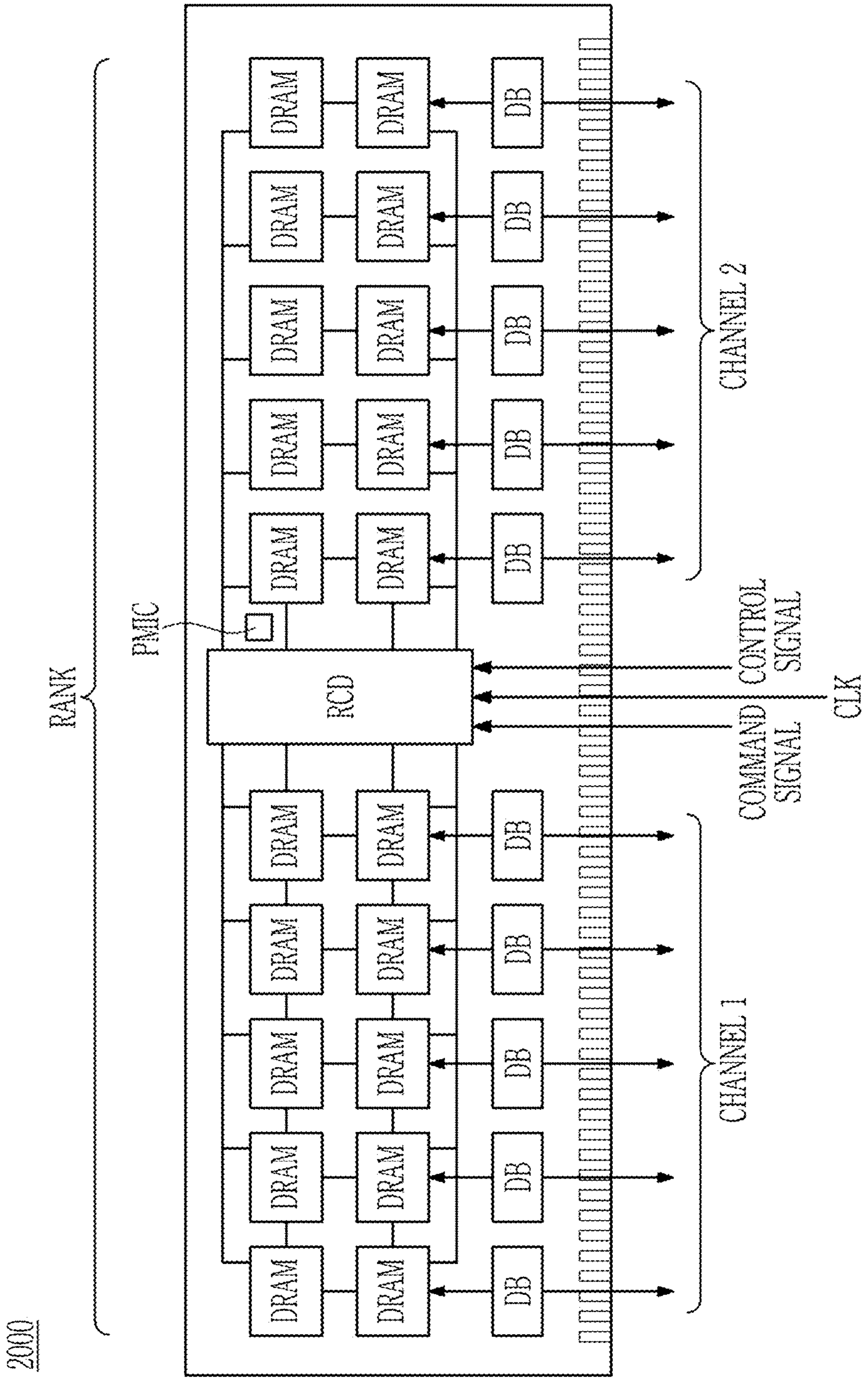
FIG. 20 is a drawing showing a memory module according to an embodiment.

FIG. 20 is a drawing showing a memory module according to an embodiment.

Referring to FIG. 20, a memory module 2000 according to an embodiment may include a plurality of memory chips DRAM each including a memory cell array, a memory controller (not shown), a buffer chip RCD for routing signals to and from the memory chips and/or managing memory operations for the memory chips, and a power management chip PMIC. The RCD may control the memory chips DRAM and the power management chip PMIC according to the control of the memory controller. For example, the RCD may receive a command signal, a control signal, and a clock signal CLK from the memory controller.

The memory chips DRAM may transmit and receive data signals and data strobe signals through corresponding data transmission lines connected to the corresponding data buffers DB. Each of the memory chips DRAM may be connected to the data buffer DB through corresponding data transmission lines, and transmit and receive parity data and the data strobe signals DQS.

The memory module 2000 may further include a programmable read-only memory (EEPROM) (not shown). The EEPROM may include initial information or device information of the memory module 2000. For example, the EEPROM may include initial information or device information such as module type, module configuration, storage capacity, module type, execution environment, etc. of the memory module 2000. When the memory system including the memory module 2000 is booted, the memory controller may read device information from the EEPROM and recognize the memory module based on the read device information.

The memory module 2000 may include a plurality of ranks. In an embodiment, each rank may include eight bank groups. Each bank group may include four banks.

The memory module 2000 may perform the refresh operation described with reference to FIG. 1 to FIG. 18. For example, the memory module 2000 may perform the normal refresh or the TRR in response to a command of the memory controller. For example, upon receiving the activation signal, the memory module 2000 may count the number of received activation signals. Upon receiving the activation signal, the memory module 2000 may generate the reference value based on a counted number. Upon receiving the activation signal, memory module 2000 may generate the random number. The memory module 2000 may compare the random number with the reference value, and determine the attack row address based on the comparison result. The memory module 2000 may determine the victim row address corresponding to the victim row adjacent to the attack row corresponding to the attack row address, and perform the TRR by using the victim row address.

Figure 21:
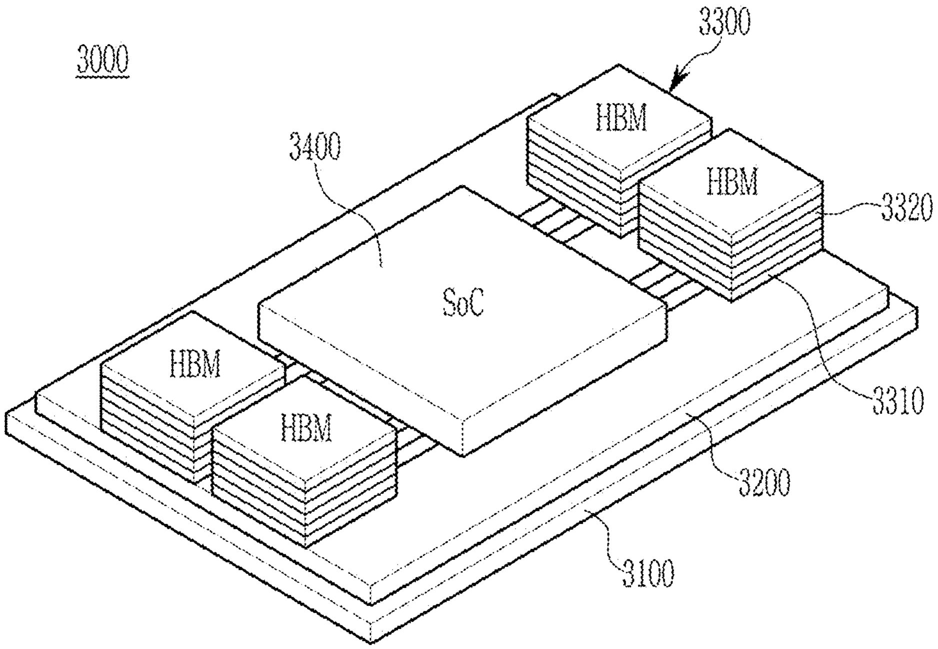
FIG. 21 is a drawing showing a semiconductor package according to an embodiment.

FIG. 21 is a drawing showing a semiconductor package according to an embodiment.

Referring to FIG. 21, a semiconductor package 3000 according to an embodiment may be a memory module including at least one stack semiconductor chip 3300 and a system-on-chip (SoC) 3400 mounted on a package substrate 3100 such as a printed circuit board. In an embodiment, an interposer 3200 may be selectively further provided on the package substrate 3100. The stack semiconductor chip 3300 may be formed as a chip-on-chip (CoC).

The stack semiconductor chip 3300 may include at least one memory chip 3320 stacked on a buffer chip 3310 such as a logic chip. The buffer chip 3310 and at least one memory chip 3320 may be connected to each other through a through substrate via (e.g., a through silicon via (TSV)). The buffer chip 3310 may perform a training operation on the memory chip 3320. For example, the stack semiconductor chip 3300 may be a high bandwidth memory (HBM) of 500 GB/sec to 1 TB/sec or more.

The at least one memory chip 3320 may perform the refresh operation described with reference to FIG. 1 to FIG. 18. For example, the at least one memory chip 3320 may perform the normal refresh or the TRR in response to a command from the system-on-chip 3400 or the memory controller. For example, upon receiving the activation signal, the at least one memory chip 3320 may count the number of received activation signals. Upon receiving the activation signal, the at least one memory chip 3320 may generate the reference value based on a counted number. Upon receiving the activation signal, the at least one memory chip 3320 may generate a random number. The at least one memory chip 3320 may compare the random number with the reference value, and determine the attack row address based on the comparison result. The at least one memory chip 3320 may determine the victim row address corresponding to the victim row adjacent to the attack row corresponding to the attack row address, and perform the TRR by using the victim row address.

In some embodiments, each component or combinations of two or more components described with reference to FIG. 1 to FIG. 21 may be implemented as a digital circuit, a programmable or non-programmable logic device or array, an application specific integrated circuit (ASIC), or the like.

While this disclosure has been described in connection with what is presently considered to be practical embodiments, it is to be understood that the invention is not limited to the disclosed embodiments, but, on the contrary, is intended to cover various modifications and equivalent arrangements included within the spirit and scope of the present invention as set forth in the appended claims.

What is claimed is:

1. A memory device, comprising:

a memory cell array including a plurality of memory cells; and a refresh control circuit configured to:

receive a first activation signal and a first activation row address corresponding to the first activation signal from an external device at a first time point, determine a victim row address to be refreshed on a victim row in the memory cell array based on an accumulation value, generate a random number in response to the first activation signal being received, generate a reference value based on the accumulation value, and generate an update signal based on the reference value and the random number, wherein the accumulation value is the number of activation signals received from a time point of receiving a refresh command from the external device to the first time point.

2. The memory device of claim 1, wherein the refresh control circuit comprises:

an attack row determiner configured to select the first activation row address as an attack row address based on the accumulation value calculated from a first target row refresh (TRR) time point to the first time point subsequent to the first TRR time point; and a victim row determiner configured to determine the victim row address based on the attack row address, wherein the first TRR time point is determined based on a time point of receiving the refresh command.

3. The memory device of claim 2, further comprising:

a register having a size corresponding to a maximum value of the number of activation signals received during a TRR interval, and configured to store at least one activation row address received during the TRR interval, wherein the attack row determiner is configured to select one among the at least one activation row address stored in the register.

4. The memory device of claim 3, wherein the register has a size corresponding to the maximum value determined based on a count of a normal refresh included in the TRR interval.

5. The memory device of claim 3, further comprising:

a logic circuit configured to generate a TRR signal and a normal refresh signal in response to the refresh command, wherein the register is configured to receive the TRR signal at a second TRR time point subsequent to the first TRR time point, and erase the stored at least one activation row address in response to the TRR signal.

6. The memory device of claim 2, wherein the attack row determiner comprises:

a counter configured to count the accumulation value from the first TRR time point to the first time point;

a random number generator configured to generate the random number;

a reference value generator configured to generate the reference value;

a comparator configured to generate the update signal; and an attack row register configured to receive the first activation row address at the first time point, and determine whether to store the first activation row address based on the update signal.

7. The memory device of claim 6, wherein the reference value generator is configured to generate the reference value to be smaller as the accumulation value increases.

8. The memory device of claim 6, wherein the attack row register has a size corresponding to one row address, and the attack row register is configured to, in response to the update signal having a first level:

store the first activation row address, and output the first activation row address at a second TRR time point subsequent to the first TRR time point to the victim row determiner.

9. The memory device of claim 6, wherein:

the random number generator includes a linear feedback shift register, the random number is a real number between 0 and 1 generated from the linear feedback shift register, the reference value is '1/(the accumulation value)', the comparator is configured to generate the update signal having a first level based on the random number smaller than or equal to the reference value at the first time point, and the attack row register is configured to store the first activation row address based on the update signal having the first level.

10. A refresh method of a memory device, the method comprising:

receiving a first activation signal and a first activation row address corresponding to the first activation signal at a first time point;

generating a random number when the first activation signal is received;

generating a reference value based on the number of activation signals received from an immediately previous first target row refresh (TRR) time point to the first time point;

determining an attack row address based on a magnitude relationship between the random number and the reference value;

determining a victim row address based on the attack row address; and performing a refresh operation on a victim row corresponding to the victim row address at a second TRR time point subsequent to the first time point.

* * * * *